United States Patent
Baum

(10) Patent No.: US 7,693,189 B2
(45) Date of Patent: Apr. 6, 2010

(54) HPNA HUB

(75) Inventor: David Baum, Ramat Gan (IL)

(73) Assignee: Coppergate Communication Ltd., Tel Aviv (IL)

( * ) Notice: Subject to any disclaimer, the term of this patent is extended or adjusted under 35 U.S.C. 154(b) by 2140 days.

(21) Appl. No.: 10/330,703

(22) Filed: Dec. 27, 2002

(65) Prior Publication Data

US 2004/0076142 A1 Apr. 22, 2004

Related U.S. Application Data

(63) Continuation-in-part of application No. 10/272,881, filed on Oct. 17, 2002, now Pat. No. 6,999,433.

(51) Int. Cl.
*H04J 1/02* (2006.01)
(52) U.S. Cl. .................. 370/488; 370/493; 370/497; 379/399.01; 333/126
(58) Field of Classification Search .............. 370/480, 370/488, 493, 494, 495, 497, 490; 379/399.01; 333/126
See application file for complete search history.

(56) References Cited

U.S. PATENT DOCUMENTS

| | | | | |
|---|---|---|---|---|
| 4,885,747 | A * | 12/1989 | Foglia | ........................ 370/490 |
| 5,889,856 | A * | 3/1999 | O'Toole et al. | ......... 379/399.02 |
| 5,970,068 | A | 10/1999 | Gray et al. | |
| 5,982,767 | A | 11/1999 | McIntosh et al. | |
| 5,991,311 | A | 11/1999 | Long et al. | ................... 370/524 |
| 6,137,880 | A * | 10/2000 | Bella | ..................... 379/399.01 |
| 6,252,755 | B1 | 6/2001 | Willer | ........................ 361/119 |
| 6,393,052 | B2 | 5/2002 | Sadjadpour et al. | ......... 375/222 |
| 6,430,199 | B1 | 8/2002 | Kerpez | ....................... 370/493 |
| 6,442,448 | B1 | 8/2002 | Finley et al. | |
| 6,453,040 | B1 | 9/2002 | Burke et al. | ........... 379/387.01 |
| 6,483,902 | B1 | 11/2002 | Stewart et al. | |
| 6,526,581 | B1 | 2/2003 | Edson | |
| 6,678,316 | B1 | 1/2004 | Helms et al. | |
| 6,701,406 | B1 | 3/2004 | Chang et al. | |
| 6,704,317 | B1 | 3/2004 | Dobson | |
| 6,778,646 | B1 * | 8/2004 | Sun | .......................... 379/93.05 |
| 6,868,072 | B1 * | 3/2005 | Lin et al. | ..................... 370/276 |
| 2002/0021716 | A1 * | 2/2002 | Terk | ............................ 370/493 |
| 2002/0057717 | A1 | 5/2002 | Mallory | |
| 2002/0079985 | A1 * | 6/2002 | Siadat et al. | ................. 333/126 |
| 2002/0174423 | A1 * | 11/2002 | Fifield et al. | .................... 725/1 |
| 2003/0067906 | A1 | 4/2003 | Young | |
| 2003/0139151 | A1 | 7/2003 | Lifshitz et al. | |
| 2003/0147523 | A1 | 8/2003 | Watson et al. | |
| 2003/0214972 | A1 | 11/2003 | Pollak et al. | |
| 2004/0054718 | A1 * | 3/2004 | Hicks et al. | ................. 709/203 |

FOREIGN PATENT DOCUMENTS

WO 01/58124 8/2001

* cited by examiner

*Primary Examiner*—Kwang B Yao
*Assistant Examiner*—Jeffrey M Rutkowski
(74) *Attorney, Agent, or Firm*—Darby & Darby P.C.

(57) ABSTRACT

Analog HPNA hub including at least one group of coils, the coils inducing HPNA signals there between, a plurality of filters, each of the filters coupled with a respective one of the coils and further coupled, via respective telephone wiring, with at least a respective HPNA node, wherein each of the filters enables transmission of HPNA data signals there through, and wherein each of the filters prevents transmission of conventional telephony signals there through.

4 Claims, 19 Drawing Sheets

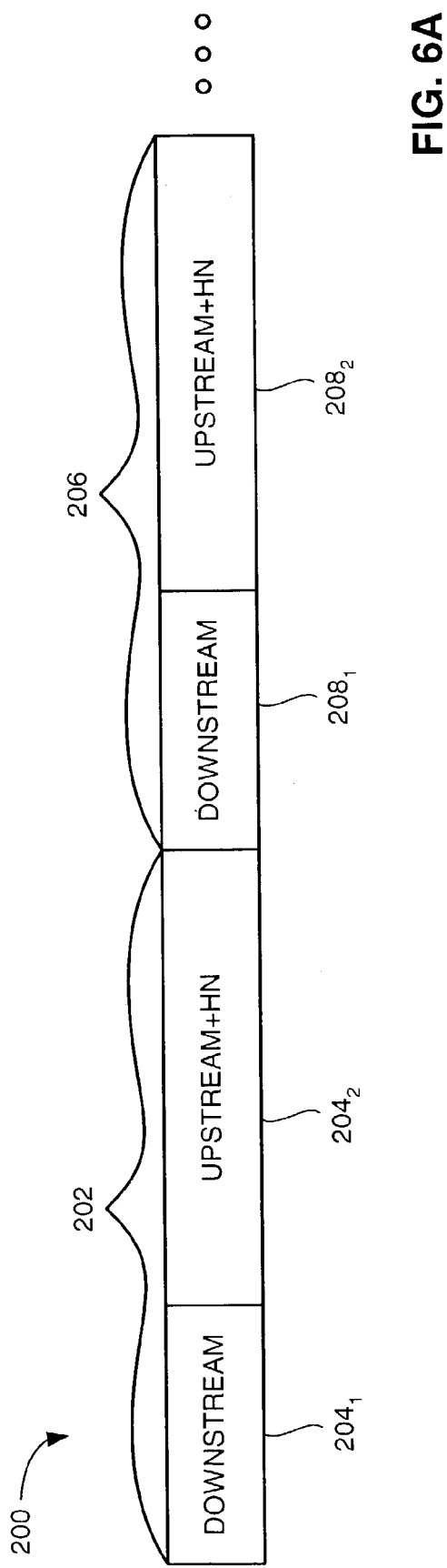
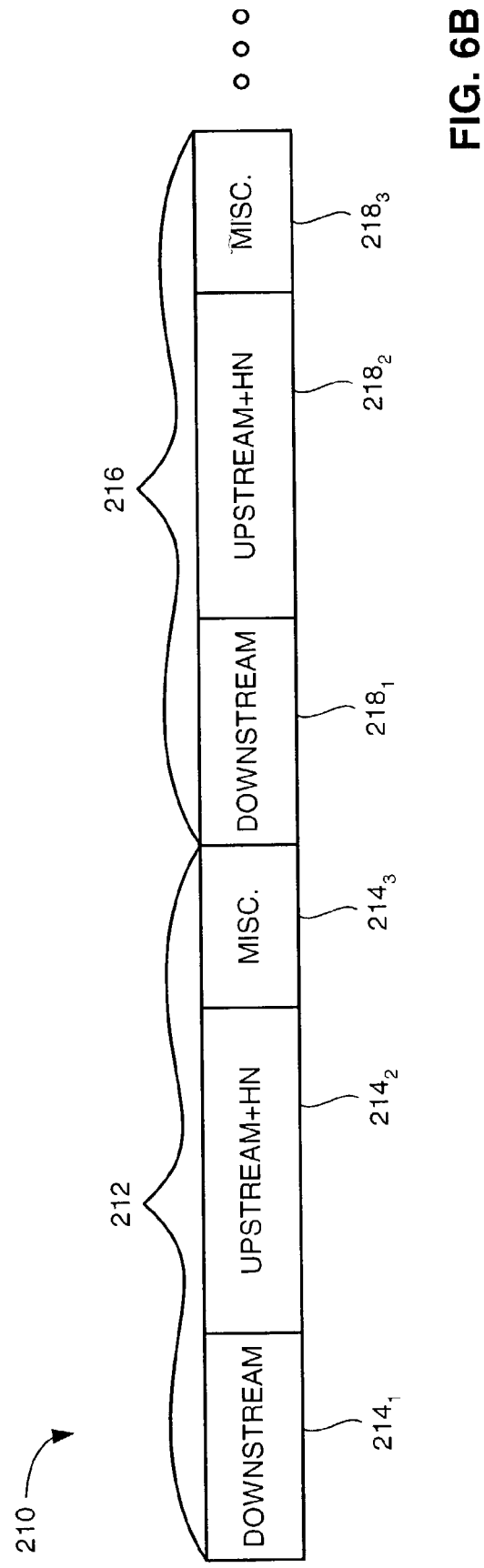
FIG. 6A
FIG. 6B

HPNA HUB

This is a continuation-in-part, of application Ser. No. 10/272,881, filed Oct. 17, 2002 now U.S. Pat. No. 6,999,433. The prior application is hereby incorporated herein by reference, in its entirety.

FIELD OF THE DISCLOSED TECHNIQUE

The disclosed technique relates to communication networks in general, and to MxU network architectures, in particular.

BACKGROUND OF THE DISCLOSED TECHNIQUE

MxU networking architecture is known in the art and is used to provide communication services to a site (e.g., an apartment building) which includes a plurality of substantially independent sections (e.g., a plurality of apartments), each associated with a different subscriber. In general, the MxU networking architecture defines a separate local area network (LAN) for each of the sections.

MxU networks which are based Home Phoneline Networking Alliance (HPNA), use the telephone lines of the telephone wire network, already installed in the MxU. Each of the LANs includes the telephone wires which are associated with a selected section (e.g., apartment) and a plurality of HPNA nodes coupled with the telephone outlets. Telephone network voice communication and data communication services can be used simultaneously, using a technique known as frequency division multiplexing (FDM). Accordingly, data signals are transmitted using a different (higher) frequency than voice data signals, whereby these signals, can be separated using a frequency splitter.

Reference is now made to FIG. 1, which is a schematic illustration of an apartment building network, generally referenced 10, which is known in the art. It is noted that FIG. 1 is not drawn to scale.

Apartment building network 10 includes intra-apartment networks $APT_1$ (referenced $12_1$), $APT_2$ (referenced $12_2$) and $APT_N$ (referenced $12_N$), and gateways $G_1$ (referenced $22_1$), $G_2$ (referenced $22_2$) and $G_N$ (referenced $22_N$). Gateways $22_1$, $22_2$ and $22_N$ are mounted on a platform 16. A broadband source 20 couples each of gateways $22_1$, $22_2$ and $22_N$ with a wide area network (WAN) such as the Internet, via a broadband link such as xDSL, cable, fiber-optic, satellite, Local Multipoint Distribution System (LMDS), and the like.

Each of intra-apartment networks $12_1$, $12_2$ and $12_N$ includes several network nodes (not shown). Each one of gateways $22_1$, $22_2$ and $22_N$ is coupled with a respective one of intra-apartment networks $12_1$, $12_2$ and $12_N$, via respective telephone wires $14_1$, $14_2$ and $14_N$. Each one of the gateways $22_1$, $22_2$ and $22_N$, and a respective one of intra-apartment networks $12_1$, $12_2$ and $12_N$, together form a respective one of local-area networks (LAN) $14_1$, $14_2$ and $14_N$. Each of LANs $14_1$, $14_2$ and $14_N$ is further coupled with telephone service lines $24_1$, $24_2$ and $24_N$, respectively.

Reference is now made to FIGS. 2A and 2B. FIGS. 2A and 2B schematically illustrate an apartment building network, generally referenced 40, which is known in the art. FIGS. 2A and 2B show a first and second example of NEXT in an MxU network, respectively. It is noted that FIGS. 2A and 2B are not drawn to scale.

With reference to FIG. 2A, apartment building network 40 includes intra-apartment networks $APT_1$ (referenced $42_1$), $APT_2$ (referenced $42_2$) and $APT_N$ (referenced $42_N$), gateways $G_1$ (referenced $52_1$), $G_2$ (referenced $52_2$) and $G_N$ (referenced $52_N$), and phone wires $54_1$, $54_2$ and $54_N$. A wire binder 48 runs from a basement 44 of the apartment building, to the vicinity of intra-apartment networks $42_1$, $42_2$ and $42_N$. A platform 46 is located in basement 44. Gateways $52_1$, $52_2$ and $52_N$ are mounted on platform 46. A broadband source 50 couples each of gateways $52_1$, $52_2$ and $52_N$ with a WAN such as the Internet, via a broadband link such as xDSL, cable, fiber-optic, satellite, Local Multipoint Distribution System (LMDS), and the like.

Each of intra-apartment networks $42_1$, $42_2$ and $42_N$ includes several network nodes (not shown), as shall be described in further detail with reference to FIG. 2C. Each one of gateways $52_1$, $52_2$ and $52_N$ is coupled with a respective one of intra-apartment networks $42_1$, $42_2$ and $42_N$, via respective phone wires $54_1$, $54_2$ and $54_N$. Each combination of one of the gateways $52_1$, $52_2$ and $52_N$, the respective one of phone wires $54_1$, $54_2$ and $54_N$, and the respective one of intra-apartment networks $42_1$, $42_2$ and $42_N$, together form a respective one of local-area networks (LANs) $45_1$, $45_2$ and $45_N$. Phone wires $54_1$, $54_2$ and $54_N$ are bound together in binder 48.

Gateway $52_1$ transmits a data signal 56 to intra-apartment network $42_1$. Simultaneously, intra-apartment network $42_2$ transmits another data signal 58 to gateway $52_2$. In a region 62, located in the vicinity of platform 46, an electrical disturbance 60, associated with data signal 56 (from phone wire $54_1$), is induced in phone wire $54_2$, causing an interference in data signal 58.

It is noted that conventionally, the distance between intra-apartment network $42_2$ and region 62 is significantly greater than the distance between gateway $52_1$ and region 62. Therefore, data signal 58 undergoes a significantly greater attenuation than data signal 56, before these data signals reach region 62, and hence, electrical disturbance 60 may cause a significant interference in data signal 58. This effect is known as near-end crosstalk (NEXT). It is noted that the transfer of disturbance 60 from phone wire $54_1$ to phone wire $54_2$ is a cumulative effect, which takes place all along phone wires $54_1$ and $54_2$, with a primary contribution occurring in region 62.

With reference to FIG. 2B, gateway $52_1$ transmits a data signal 70 to intra-apartment network $42_1$. Simultaneously, intra-apartment network $42_1$ transmits another data signal 72 to gateway $52_2$. In a region 76, located in the vicinity of intra-apartment networks $42_1$ and $42_2$, an electrical disturbance 74, associated with data signal 72 (from phone wire $54_2$), is induced in phone wire $54_1$, causing an interference in data signal 70.

It is noted that conventionally, the distance between gateway $52_1$ and region 76 is significantly greater than the distance between intra-apartment network $42_1$ and region 76. Therefore, data signal 70 undergoes a significantly greater attenuation than data signal 72, before these data signals reach region 76, and hence, electrical disturbance 74 may cause a significant interference in data signal 70.

Reference is further made to FIG. 2C, which is an illustration in detail of intra-apartment networks $42_1$ and $42_1$ of apartment building network 40 (FIGS. 2A and 2B) and a portion of the binder 48. FIG. 2C shows a third example of NEXT in an MxU network. It is noted that FIG. 2C is not drawn to scale.

Intra-apartment network $42_1$ includes network nodes $80_1$, $80_2$ and $80_3$. Nodes $80_1$, $80_2$ and $80_3$ are coupled there between via phone wire $54_1$. Intra-apartment network $42_2$ includes nodes $82_1$ and $82_2$. Nodes $82_1$ and $82_2$ are coupled there between via phone wire $54_2$.

Gateway $52_2$ (FIG. 2A) transmits a data signal 86, through phone wire $54_2$, toward intra-apartment network $42_2$. Simultaneously, node $80_1$ transmits another data signal 88 toward node $80_2$.

It is noted that conventionally, data signal 88 includes a header with source and target attributes. All of the nodes of LAN $45_1$ (FIG. 2A) receive data signal 88, but only the target node, which is specified in the source-target attributes (i.e., node $80_2$) addresses and decodes the data signal. It is noted that in the description that follows and the accompanying drawings, except for the present example, data signals are only shown on their path to their intended receiving node.

Data signal 88 passes through phone wire $54_1$ toward binder 48. In a region 84 in the vicinity of intra-apartment networks $42_1$ and $42_2$, an electrical disturbance 92, associated with data signal 88 (from phone wire $54_1$), is induced in phone wire $54_2$, causing an interference in data signal 86. Similarly as in the example set forth in FIGS. 2A and 2B, electrical disturbance 92 may cause a significant interference in data signal 86.

SUMMARY OF THE DISCLOSED TECHNIQUE

It is an object of the disclosed technique to provide a novel HPNA MxU hub, which is operative to share and exchange network resources, and which overcomes the disadvantages of the prior art.

In accordance with the disclosed technique, there is thus provided an analog HPNA hub including at least one group of coils. Each group of coils includes a plurality of coils, inducing HPNA signals there between. The analog HPNA hub further includes a plurality of filters. Each of the filters is coupled with a respective one of the coils, and further coupled, via respective telephone wiring, with at least a respective HPNA node. Each of the filters enables transmission of HPNA data signals there through, and prevents transmission of conventional telephony signals there through.

In accordance with another aspect of the disclosed technique, there is provided an HPNA network, the network including at least one analog HPNA hub, and at least one group of HPNA nodes. Each group is associated with a respective one of the analog HPNA hubs. Each analog HPNA hub includes a plurality of coils, for inducing HPNA signals there between. Each analog HPNA hub further includes a plurality of filters. Each filter is coupled with a respective one of the coils, and further coupled, via respective telephone wiring, with at least an HPNA node in the respective group. Each of the filters enables transmission of HPNA data signals there through, and prevents transmission of conventional telephony signals there through.

BRIEF DESCRIPTION OF THE DRAWINGS

The disclosed technique will be understood and appreciated more fully from the following detailed description taken in conjunction with the drawings in which:

FIG. 6A is a schematic illustration of a timeslot scheme sequence, constructed in accordance with another embodiment of the disclosed technique;

FIG. 6B is a schematic illustration of a timeslot scheme sequence, constructed in accordance with a further embodiment of the disclosed technique;

DETAILED DESCRIPTION OF THE EMBODIMENTS

The disclosed technique overcomes the disadvantages of the prior art by providing a novel analog HPNA hub for an MxU network, which enables data signal transmissions between different HPNA local (i.e., intra-apartment) networks of the MxU network to pass there through, while preventing conventional telephony transmissions between the HPNA local networks, from passing there through.

In the description that follows, the terms MDU (multi-dwelling unit), MTU (multi-tenant unit), MCU (multi-company unit), MHU (multi-hospitality unit), MPU (multi-public unit), MEU (multi-embedded unit), are generally termed MxU. An MxU may be an apartment building, a condominium complex, a hotel, a motel, a resort, an office building, an industrial park, a college or university campus dormitory, a hospital, an airport, a train station, a convention center, a shopping mall, an airplane, a ship, and the like.

Figure 1:
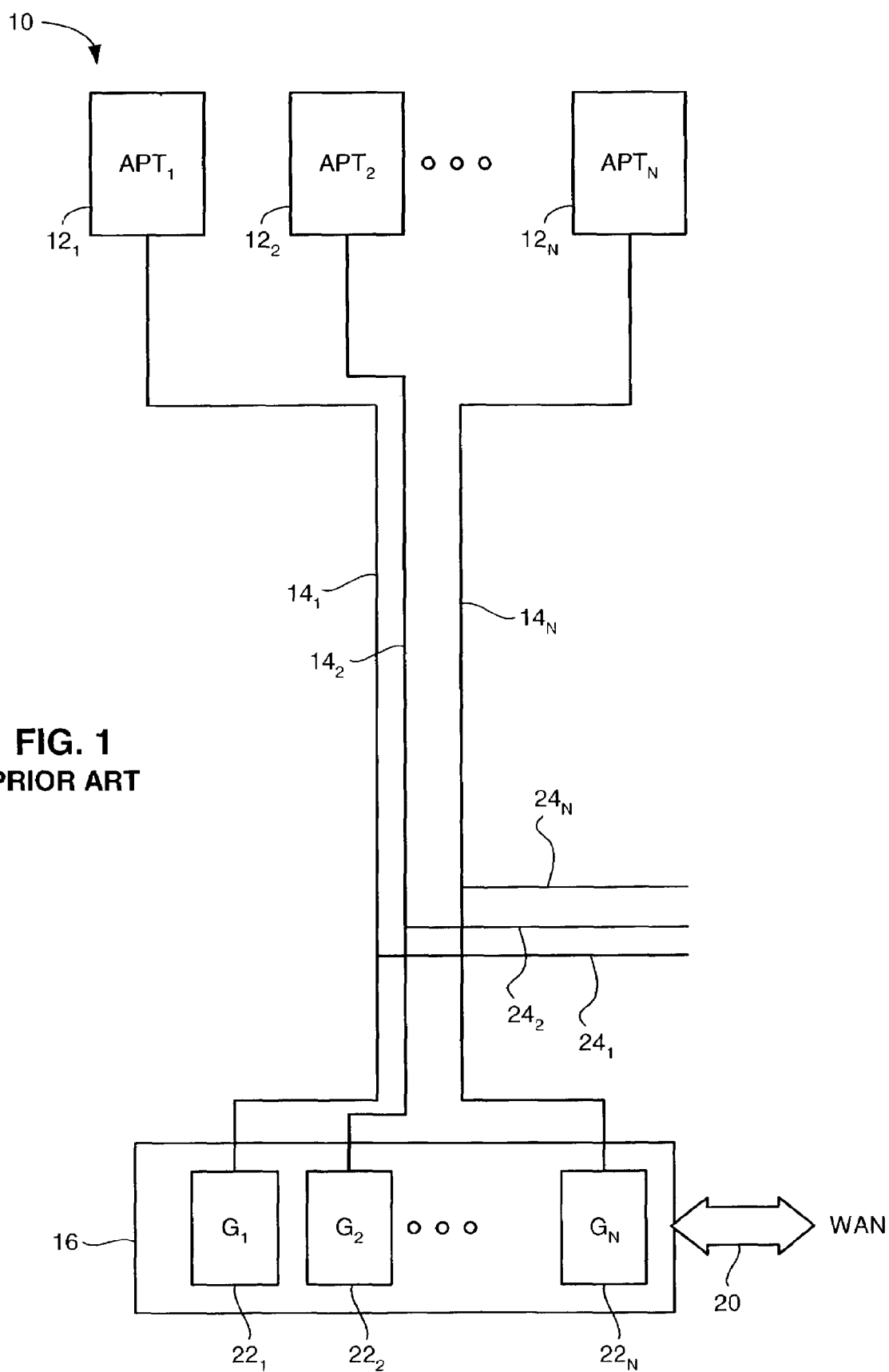
FIG. 1 is a schematic illustration of an apartment building network, which is known in the art.
Figure 2A:
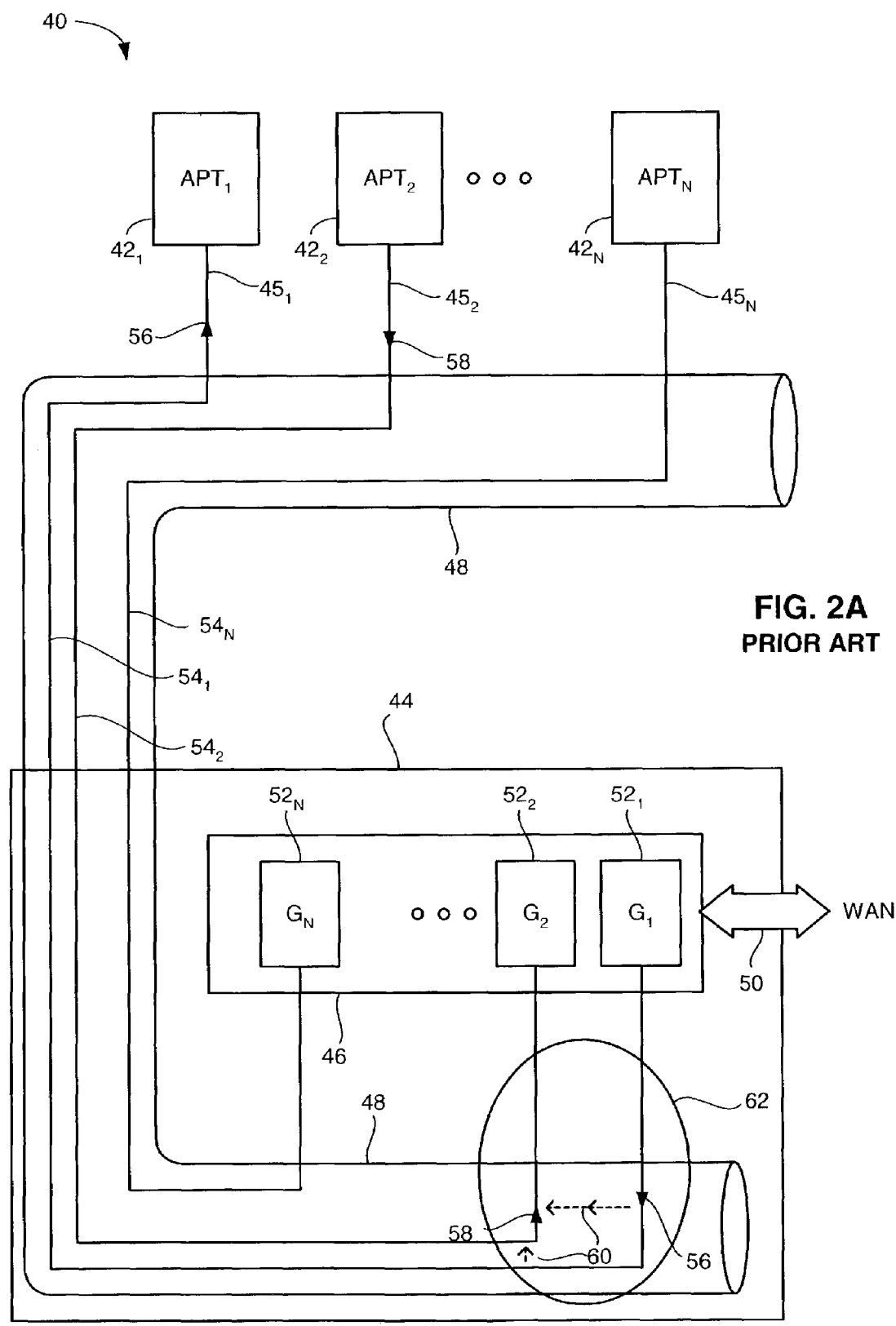
FIG. 2A is a schematic illustration of an apartment building network which is known in the art, showing a first example of NEXT in an MxU network.
Figure 2B:
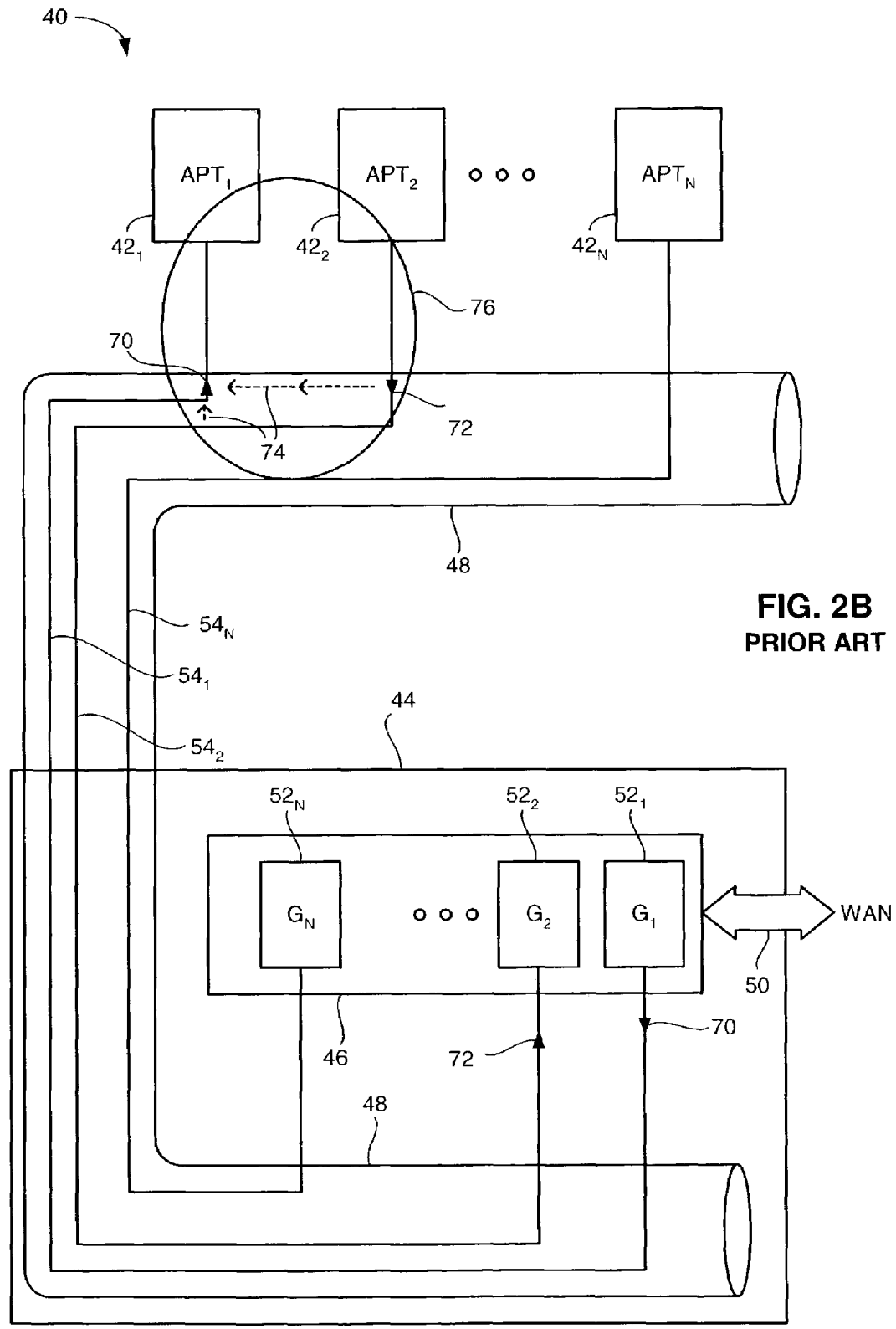
FIG. 2B is a schematic illustration of the apartment building network of FIG. 2A, showing a second example of NEXT in an MxU network.
Figure 2C:
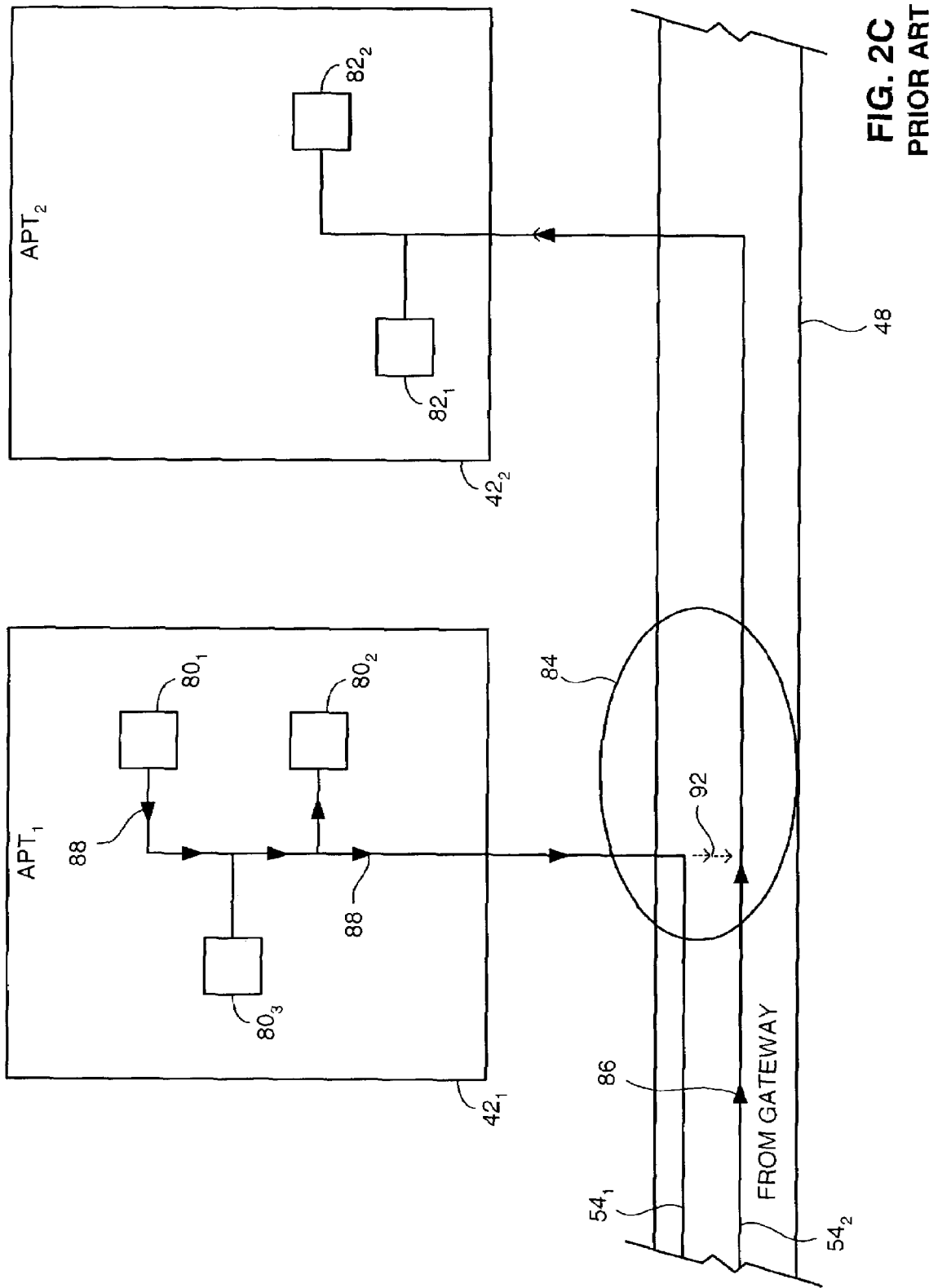
FIG. 2C is an illustration in detail of two of the intra-apartment networks of the apartment building of FIGS. 2A and 2B and a portion of the binder, showing a third example of NEXT in an MxU network.
Figure 3:
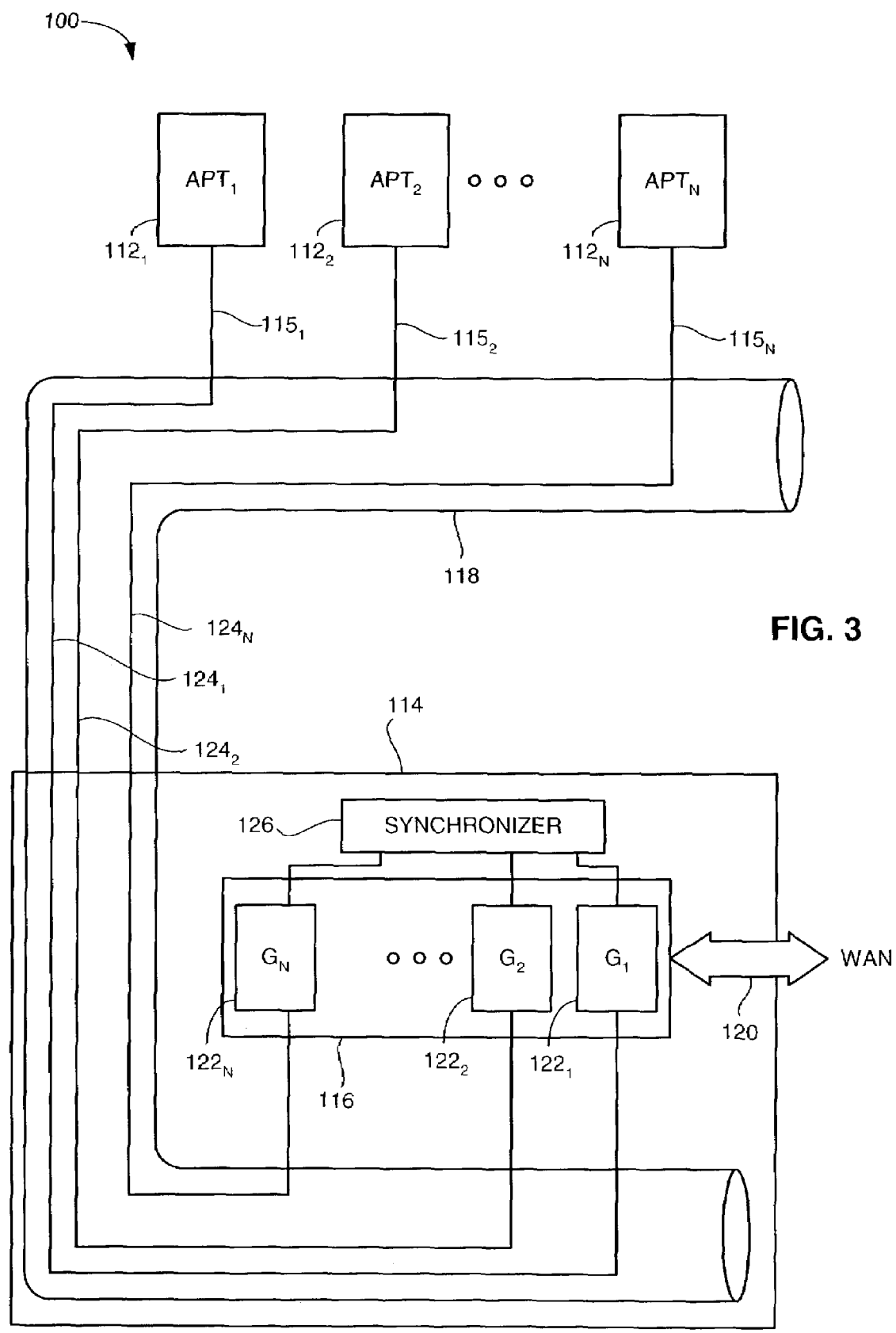
FIG. 3 is a schematic illustration of an MxU network, constructed and operative in accordance with an embodiment of the disclosed technique.

Reference is now made to FIG. 3, which is a schematic illustration of an MxU network, generally referenced 100, constructed and operative in accordance with an embodiment of the disclosed technique. It is noted that FIG. 3 is not drawn to scale. In the present example, MxU network 100 is an apartment building network. It is noted, however, that the disclosed technique is applicable for any type of MxU network.

In the description that follows, the term "phone wire" is defined as a line which can be used for communicating conventional telephony signals and HPNA signals. A phone wire can be constructed by twisting together two insulated copper wires.

Apartment building network 100 includes intra-apartment networks $APT_1$ (referenced $112_1$), $APT_2$ (referenced $112_2$) and $APT_N$ (referenced $112_N$), gateways $G_1$ (referenced $122_1$), $G_2$ (referenced $122_2$) and $G_N$ (referenced $122_N$), and phone wires $124_1$, $124_2$ and $124_N$. A wire binder 118 runs from a basement 114 of the apartment building, to the vicinity of intra-apartment networks $112_1$, $112_2$ and $122_N$. A platform 116 and a synchronizer 126 are located in communication room 114. Gateways $G_1$, $G_2$, and $G_N$, referenced $122_1$, $122_2$ and $122_N$, respectively, are mounted on platform 116. A broadband source 120 couples gateways $122_1$, $122_2$ and $122_N$ with a wide area network (WAN) such as xDSL, cable, fiber-optic, satellite, Local Multipoint Distribution System (LMDS), and the like. Synchronizer 126 is coupled with gateways $122_1$, $122_2$ and $122_N$.

In the present example, communication room 114 is a basement. It is noted, however, that the communication room 114 may be any physical space housing the gateways of the network, such as a basement, a cupboard, a cabinet, and the like. Phone wires $124_1$, $124_2$ and $124_N$ are bound together in binder 118.

Platform 116 provides access to gateways $122_1$, $122_2$ and $122_N$, by multiplexing the broadband source 120. It is noted that platform 116 may further provide other functions to gateways $122_1$, $122_2$ and $122_N$, such as routing, switching, dynamic IP address assignment, voice access, power, and the like. For example, platform 116 may be a Digital Subscriber Line Access Multiplexer (DSLAM), a Next Generation Digital Loop Carrier (NGDLC), and the like.

Each of intra-apartment networks $112_1$, $112_2$ and $112_N$ includes several network nodes (not shown), as shall be described in further detail with reference to FIGS. 7A and 7B. Each combination of one of the gateways $122_1$, $122_2$ and $122_N$, the respective one of phone wires $124_1$, $124_2$ and $124_N$, and the respective one of intra-apartment networks $112_1$, $112_2$ and $112_N$, together form a respective one of local-area networks (LANs) $115_1$, $115_2$ and $115_N$.

Data signals transmitted from one of the gateways $122_1$, $122_2$ or $122_N$, to the respective intra-apartment network, are known as downstream data signals. Data signals transmitted from one of the intra-apartment networks $112_1$, $112_2$ and $112_N$, to the respective gateway, are known as upstream data signals. Data signals transmitted and received within one of the intra-apartment networks, are known as home networking (HN) data signals.

Each of gateways $122_1$, $122_2$ and $122_N$ operates as a master node of the respective one of LANs $115_1$, $115_2$ and $115_N$ (i.e., each gateway is a LAN-master). In other words, each gateway enables or disables all of the nodes in the respective LAN to transmit data signals. Synchronizer 126 synchronizes all of the gateways $122_1$, $122_2$ and $122_N$, so that all of the LANs $115_1$, $115_2$ and $115_N$, transmit upstream, downstream and HN data signals in synchrony, as shall be described in further detail with reference to FIGS. 6A and 6B.

It is noted that synchronizer 126 may generally be coupled with gateways $122_1$, $122_2$ and $122_N$ via wired or wireless connections. It is further noted that synchronizer 126 may generally be located in various locations inside or outside of basement 114, and inside the apartment building or at a remote location.

Figure 4:
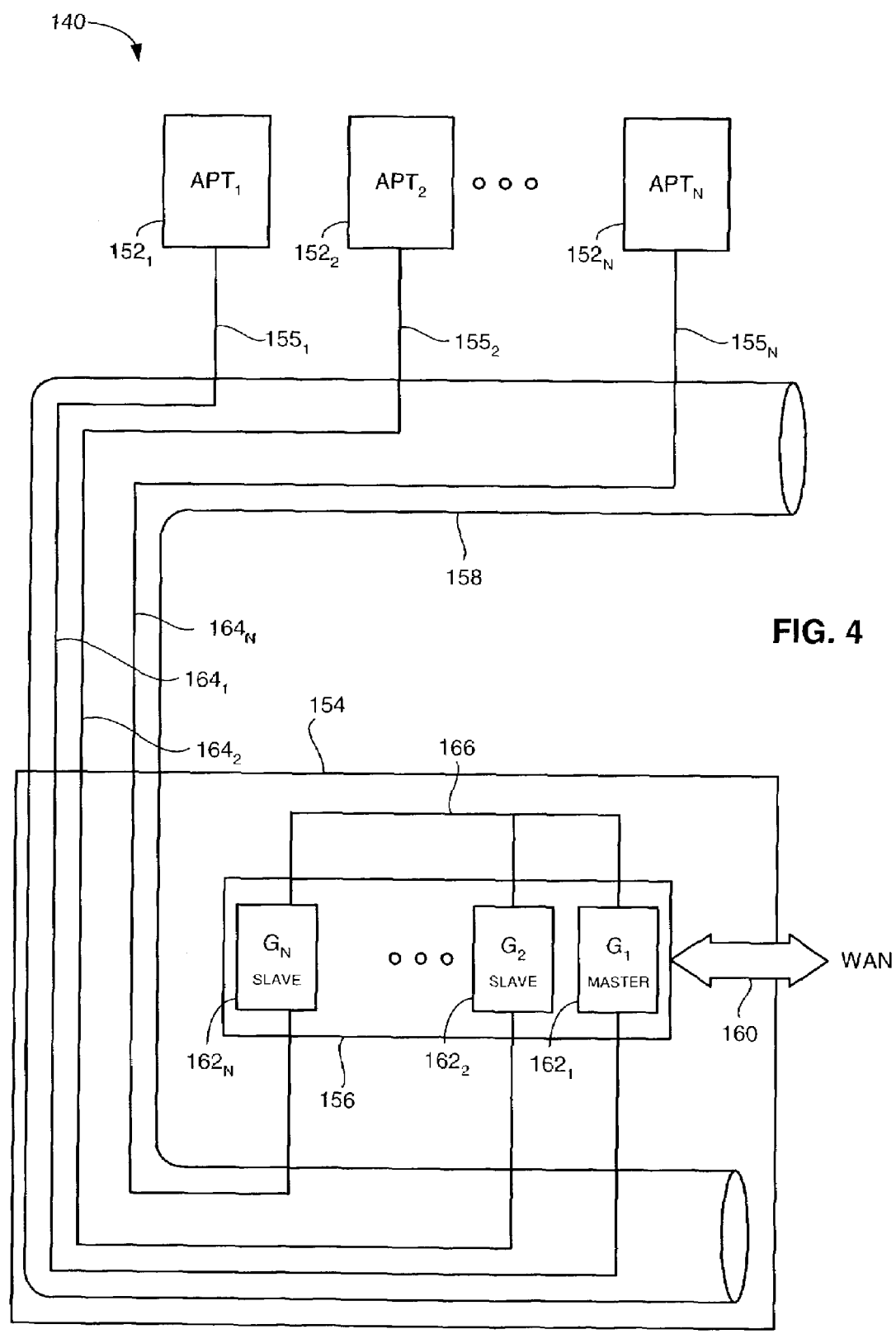
FIG. 4 is a schematic illustration of an apartment building network, constructed and operative in accordance with another embodiment of the disclosed technique.

Reference is now made to FIG. 4, which is a schematic illustration of an apartment building network, generally referenced 140, constructed and operative in accordance with another embodiment of the disclosed technique. According to the architecture of network 140, the synchronizer is incorporated within one of the LAN-masters, whereby this LAN-master operates as a master relative to the other LAN-masters of the network.

Apartment building network 140 includes intra-apartment networks $APT_1$ (referenced $152_1$), $APT_2$ (referenced $152_2$) and $APT_N$ (referenced $152_N$), gateways $G_1$ (referenced $162_1$), $G_2$ (referenced $162_2$) and $G_N$ (referenced $162_N$), and phone wire $164_1$, $164_2$ and $164_N$. A wire binder 158 runs from a basement 154 to the vicinity of intra-apartment networks $152_1$, $152_2$ and $152_3$. Gateways $162_1$, $162_2$ and $162_N$ are mounted on a platform 156. A broadband source 160 couples gateways $162_1$, $162_2$ and $162_N$ with a WAN. The combinations of intra-apartment networks $152_1$, $152_2$ and $152_3$, phone wires $164_1$, $164_2$ and $164_N$ and gateways $162_1$, $162_2$ and $162_N$ form LANs $155_1$, $155_2$ and $155_N$, similarly as in apartment building network 100 of FIG. 3.

Gateways $162_1$, $162_2$ and $162_N$ are coupled there between via a synchronicity link 166. It is noted that synchronicity link 166 may be wired or wireless. Gateway $162_1$ operates as a master gateway to the rest of the gateways, which operate as slave gateways (i.e., gateway $162_1$ controls when the other gateways, and the nodes of their respective LANs, transmit data signals). Gateway $162_1$ synchronizes all of the LANs to transmit upstream, downstream and HN data signals in synchrony, as shall be described in further detail with reference to FIGS. 6A and 6B.

Figure 5:
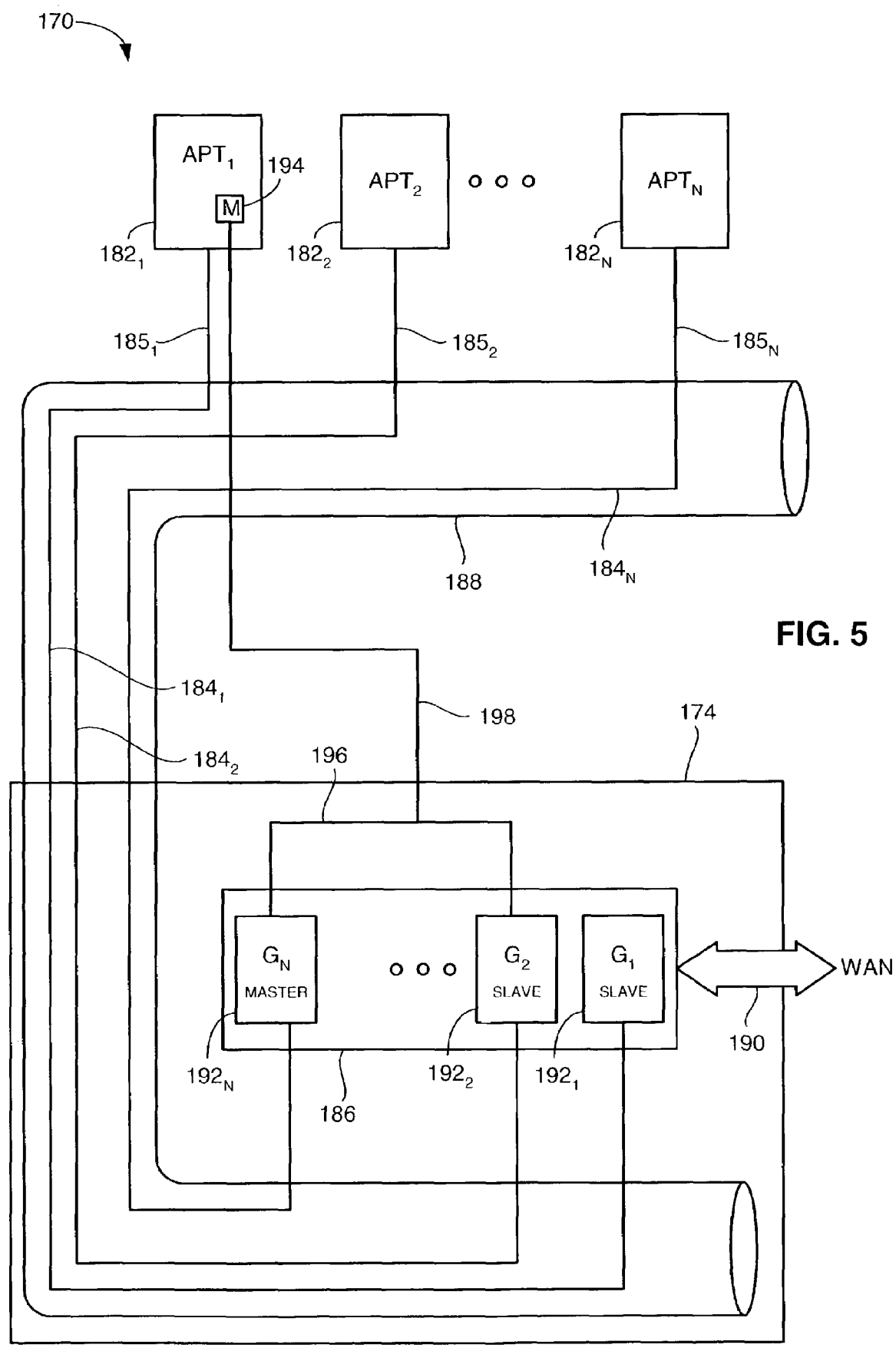
FIG. 5 is a schematic illustration of an apartment building network, constructed and operative in accordance with a further embodiment of the disclosed technique.

Reference is now made to FIG. 5, which is a schematic illustration of an apartment building network, constructed and operative in accordance with a further embodiment of the disclosed technique. Apartment building network 170 includes intra-apartment networks $APT_1$ (referenced $152_1$), $APT_2$ (referenced $152_2$) and $APT_N$ (referenced $152_N$), gateways $G_1$ (referenced $162_1$), $G_2$ (referenced $162_2$) and $G_N$ (referenced $162_N$), and phone wires $164_1$, $164_2$ and $164_N$. A wire binder 188 runs from a basement 174 to the vicinity of intra-apartment networks $182_1$, $182_2$ and $182_3$. Gateways $192_1$, $192_2$ and $192_N$ are mounted on a platform 186. A broadband source 190 couples gateways $192_1$, $192_2$ and $192_N$ with a WAN. The combinations of intra-apartment networks $182_1$, $182_2$ and $182_3$, phone wires $184_1$, $184_2$ and $184_N$ and gateways $192_1$, $192_2$ and $192_N$ form LANs $185_1$, $185_2$ and $185_N$, similarly as in apartment building network 100 of FIG. 3. However, gateway $192_1$ does not operate as the master node of LAN $185_1$. Rather, a node 194 of intra-apartment network $182_1$ is the LAN-master node of LAN $185_1$.

LAN-master node 194 and gateways $192_2$ and $192_N$ are coupled there between via a synchronicity link 196. Gateway $192_N$ operates as a master gateway to the rest of the LANs, similarly as gateway $162_1$. However, gateway $192_N$ synchronizes LAN $185_1$ through LAN-master node 194 (and not through gateway $192_1$).

It is noted that alternatively, LAN-master node 194 may be linked directly to master gateway $192_N$. Further alternatively, a synchronizer such as synchronizer 126 of FIG. 3, may be applied to an apartment building network similar to apartment building network 170. Accordingly, LAN-master 194 is coupled to that synchronizer. It is further noted that the disclosed technique may similarly be applied to an MxU network wherein a plurality of LAN-master nodes are not gateways.

Reference is now made to FIG. 6A, which is a schematic illustration of a timeslot scheme sequence 200, constructed in accordance with another embodiment of the disclosed technique. Sequence 200 includes cyclic timeslot schemes, of which two schemes 202 and 206 are shown. Timeslot scheme 202 includes timeslots $204_1$ and $204_2$. Timeslot scheme 206 includes timeslots $208_1$ and $208_2$. Timeslots $204_1$ and $208_1$ are allocated for downstream communication. Timeslots $204_2$ and $208_2$ are allocated for upstream communication and HN communication.

In the example set forth in FIG. 3, synchronizer 126 instructs gateways $122_1$, $122_2$ and $122_N$ and the nodes of their respective LANs that timeslots $204_1$ and $208_1$ are allocated for downstream communication only. Accordingly, only gateways $122_1$, $122_2$ and $122_N$ shall be able to transmit signals within their respective LANs $115_1$, $115_2$ and $115_N$, during timeslots $204_1$ and $208_1$. Synchronizer 126 further instructs gateways $122_1$, $122_2$ and $122_N$ and the nodes of their respective LANs, that timeslots $204_2$ and $208_2$ are allocated for upstream and HN communication only. Accordingly, only the nodes of intra-apartment networks $112_1$, $112_2$ and $112_N$ shall be able to transmit signals within their respective LANs $115_1$, $115_2$ and $115_N$, during timeslots $204_2$ and $208_2$.

For example, synchronizer 126 of FIG. 3 may include a clock (also known as a sync clock), which is coupled with all of the LAN-master nodes. The LAN-master nodes transmit data only during a certain part of the clock cycle (e.g., during the high level period of the cycle). Thus, the LAN-master nodes are synchronized with the clock, and hence are synchronized there between.

It is noted that the timeslot scheme may be determined dynamically. Accordingly, the timeslot scheme may change according to the conditions present in MxU network 100, such as the bandwidth used by each network node or LAN, the amount of upstream, downstream and HN communication, and the like. It is further noted that various other timeslot schemes may be employed, such as a timeslot scheme allocating separate timeslot for each LAN or group of LANs, a timeslot scheme involving only those LANs found interfering, and the like.

Reference is now made to FIG. 6B, which is a schematic illustration of a timeslot scheme sequence 210, constructed in accordance with a further embodiment of the disclosed technique. Sequence 210 includes repeating timeslot schemes, of which two schemes 212 and 216 are shown. Timeslot scheme 212 includes timeslots $214_1$, $214_2$ and $214_3$. Timeslot scheme 216 includes timeslots $218_1$, $218_2$ and $218_3$. Timeslots $214_1$ and $218_1$ are allocated for downstream communication. Timeslots $214_2$ and $218_2$ are allocated for upstream communication and HN communication (also referred to as upstream+HN). Timeslots $214_3$ and $218_3$ are allocated for other communication.

In the example set forth in FIG. 3, during timeslots $214_3$ and $218_3$, synchronizer 126 instructs gateways $122_1$, $122_2$ and $122_N$ and the nodes of their respective LANs, not to generate upstream, downstream, or HN data signals. For example, timeslot $214_3$ may be used for communication through the network, using a different communication specification, as shall be described with reference to FIG. 7C.

Figure 6C:
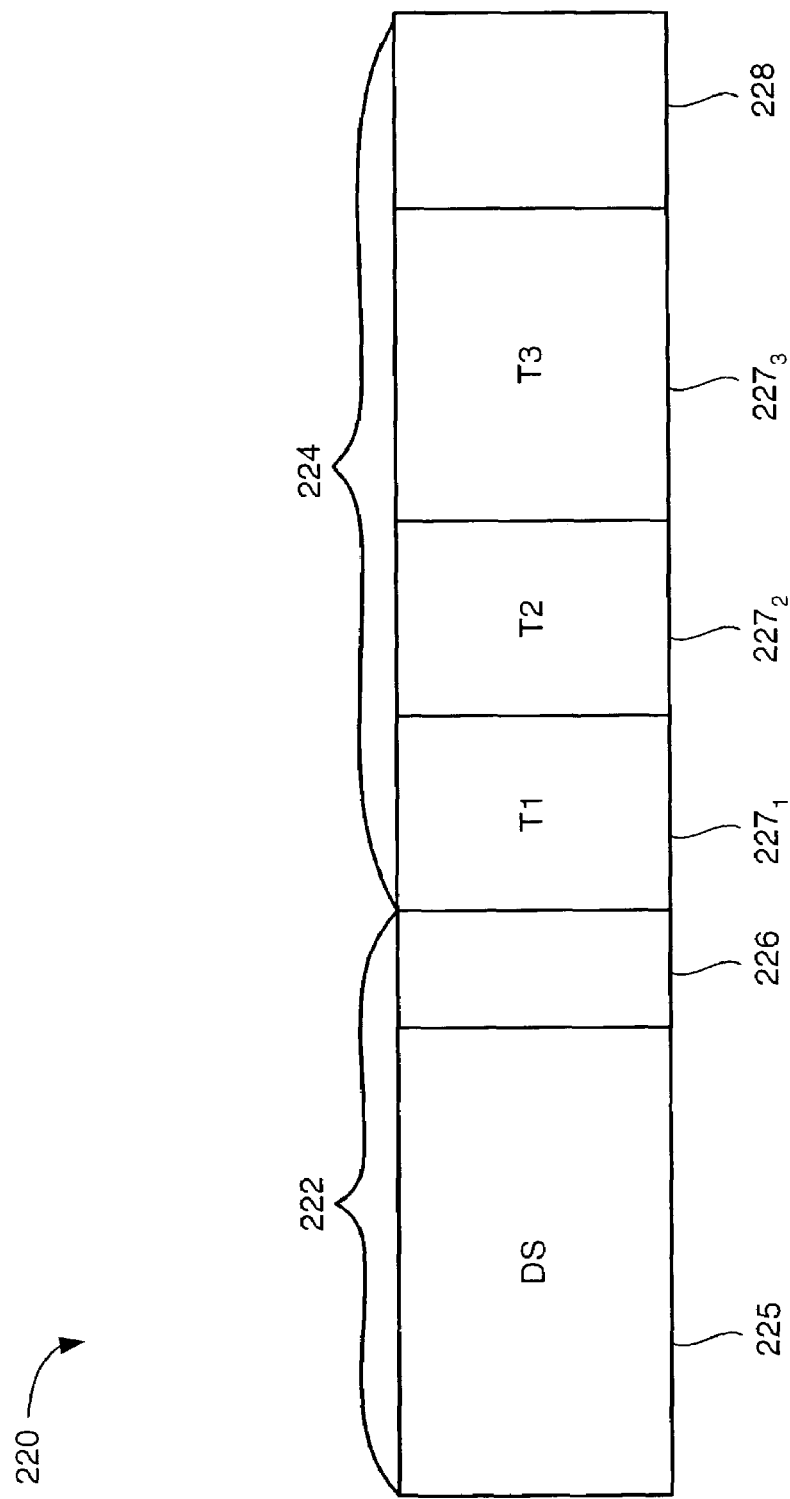
FIG. 6C is a schematic illustration of a timeslot scheme sequence, constructed in accordance with another embodiment of the disclosed technique.

Reference is now made to FIG. 6C, which is a schematic illustration of a timeslot scheme sequence 220, constructed in accordance with another embodiment of the disclosed technique. Scheme sequence 220 includes timeslots 222 and 224. Timeslot 222 includes transmission opportunity (TXOP) 225 and gap 226. Timeslot 224 includes TXOPs $227_1$, $227_2$ and $227_3$, and gap 228.

Timeslot 222 is similar to timeslot $204_1$ of FIG. 6A, allocated for downstream communication. Timeslot 224 is similar to timeslot $204_2$ (FIG. 6A), allocated for upstream+HN communication. TXOP 225 is allocated for the transmission of a specific data packet or packets, in the downstream direction. Gap 226 separates between TXOP 225 and TXOP $227_1$. Each of TXOP $227_1$, $227_2$ and $227_3$ is allocated for specific upstream or HN transmission, such as a specific data stream or a specific network node or group of nodes. Gap 228 separates between TXOP $227_3$ and the next timeslot scheme (i.e., the next cycle). It is noted that a system according to the disclosed technique may generally operate using different types of TXOPs and gaps, such as those described in U.S. patent application Ser. No. 10/127,693, which is hereby incorporated by reference.

Figure 7A:
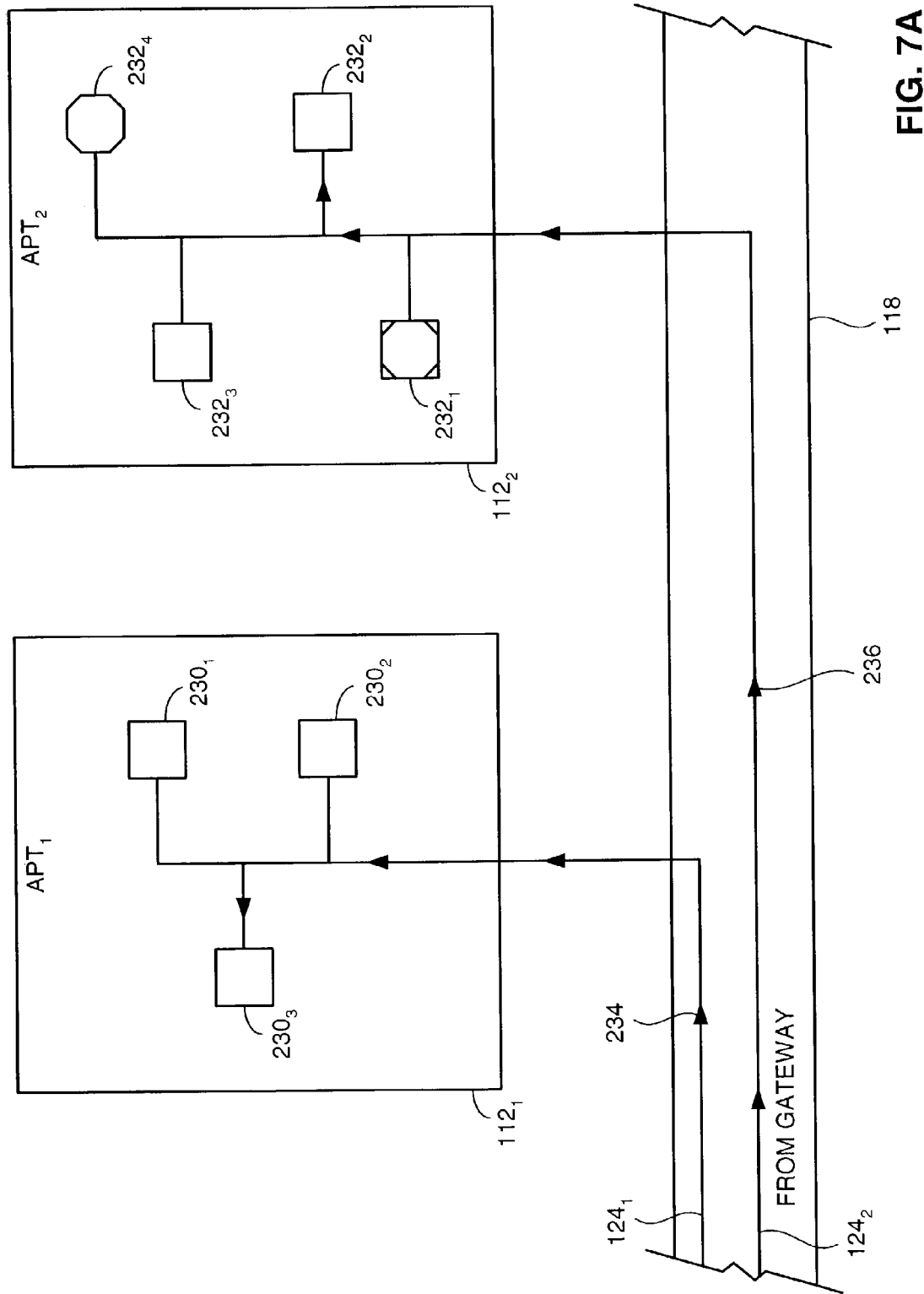
FIG. 7A is an illustration in detail of two of the intra-apartment networks of the MxU network of FIG. 3, and a portion of the binder, operating during a downstream timeslot, in accordance with a further embodiment of the disclosed technique.
Figure 7B:
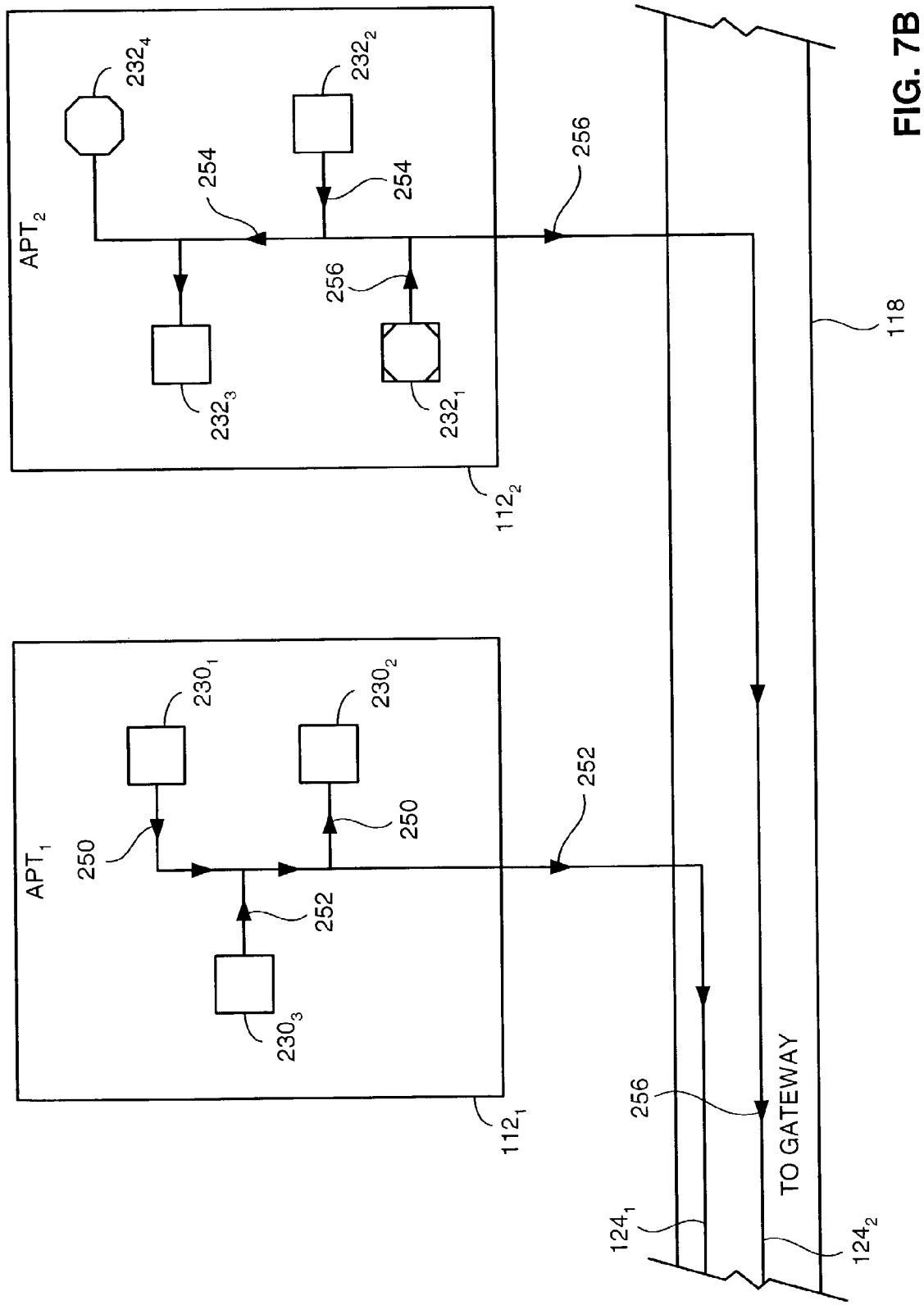
FIG. 7B is an illustration in detail of two of the intra-apartment networks of the MxU FIG. 3, and a portion of the binder, operating during an upstream+HN timeslot, in accordance with another embodiment of the disclosed technique.
Figure 7C:
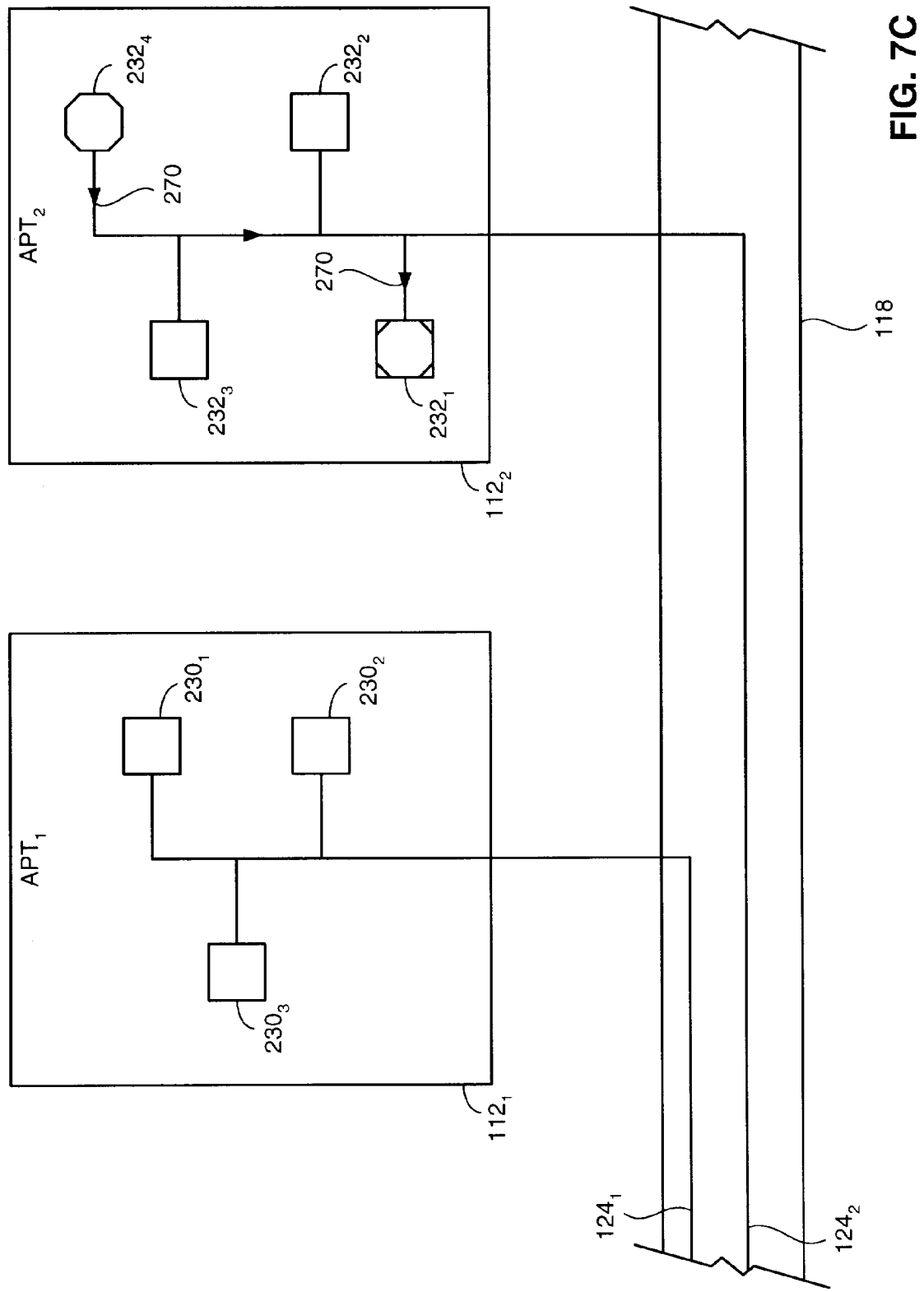
FIG. 7C is an illustration in detail of two of the intra-apartment networks of the MxU FIG. 3, and a portion of the binder, operating during an "miscellaneous" timeslot, in accordance with a further embodiment of the disclosed technique.

Reference is now made to FIGS. 7A, 7B and 7C. FIG. 7A is an illustration in detail of intra-apartment networks $112_1$ and $112_2$ of FIG. 3, and a portion of the binder 118, operating during a downstream timeslot such as timeslot $204_1$ of FIG. 6A, in accordance with a further embodiment of the disclosed technique. FIG. 7B is an illustration in detail of intra-apartment networks $112_1$ and $112_2$ of FIG. 3, and a portion of the binder 118, operating during an upstream+HN timeslot such as timeslot $204_2$ of FIG. 6A, in accordance with another embodiment of the disclosed technique. FIG. 7C is an illustration in detail of intra-apartment networks $112_1$ and $112_2$ of FIG. 3, and a portion of the binder 118, operating during an "miscellaneous" timeslot such as timeslot $214_3$ of FIG. 6B, in accordance with a further embodiment of the disclosed technique.

Intra-apartment network $112_1$ includes network nodes $230_1$, $230_2$ and $230_3$. Intra-apartment network $112_2$ includes network nodes $232_1$, $232_2$, $232_3$ and $232_4$. Nodes $232_1$, $232_2$, $232_3$ and $232_4$ are coupled there between via phone wire $124_2$. It is noted intra-apartment networks $112_1$ and $112_2$ may further include various other elements, such as additional nodes and wires, switches, and the like.

Each of network nodes $230_1$, $230_2$, $230_3$, $232_1$, $232_2$, $232_3$ and $232_4$ may be any point in the network which can transmit and receive data, such as a computer, a printer, an intercom, a digital telephone, an electrical appliance, and the like. Nodes $230_1$, $230_2$, $230_3$, $232_2$, and $232_3$ transmit and receive data according to a single, synchronous, predetermined first communication specification, such as HPNA3. Nodes $230_1$, $230_2$, $230_3$, $232_2$, and $232_3$ may operate according to a synchronous Media Access Control (MAC) as described in the above mentioned U.S. patent application Ser. No. 10/127,693.

Node $232_4$ transmits and receives data according to a second communication specification, such as HPNA2. It is noted that the second communication specification may be either synchronous or asynchronous. Node $232_1$ is capable of transmitting and receiving data signals of both the first and the second communication specification.

With reference to FIG. 7A, gateway $122_1$ transmits a data signal 234 through phone wire $124_1$, toward node $230_3$ of intra-apartment network $112_1$. Simultaneously, gateway $122_2$ transmits another data signal 236 toward node $232_2$ of intra-apartment network $112_2$.

With reference to FIG. 7B, node $230_1$ of intra-apartment network $112_1$ transmits a first data signal 250 through phone wire $124_1$, toward node $230_2$. Node $230_3$ of intra-apartment network $112_1$ transmits a second data signal 252 through phone wire $124_1$, toward gateway $122_1$. Node $232_2$ of intra-apartment network $112_2$ transmits a third data signal 254 through phone wire $124_2$, toward node $232_3$. Node $232_2$ of intra-apartment network $112_2$ transmits a fourth data signal 256 through phone wire $124_2$, toward gateway $122_2$. Data signals 250 and 252 are transmitted synchronously, within LAN $115_1$ (FIG. 3), during at least one upstream+HN timeslot. Similarly, data signals 254 and 256 are transmitted synchronously, within LAN $115_2$ (FIG. 3), during at least one upstream+HN timeslot. With reference to FIG. 7C, network node $232_4$ transmits a data signal 270 through phone wire $124_2$ to network node $232_1$.

It is noted that synchronizer 126 (FIG. 3) may restrict network node $232_1$ to transmit only during the miscellaneous timeslot, by creating conditions in network 100, which enable network node $232_1$ to transmit data signals only during the miscellaneous timeslot. For example, HPNA2 legacy units (i.e., nodes operating solely according to an older communication specification, and not according to later communication specification such as HPNA3 units), detect the various properties of the network (e.g., voltage, current, frequency spectrum) in order to determine if other nodes are transmitting. An HPNA2 node can transmit signals when it detects that no HPNA signal is being transmitted on the communication line. Hence, either the synchronizer (when directly coupled with the LANs) or the LAN-master nodes, can apply the appropriate signals on the network to prevent legacy units transmitting, during the downstream timeslots and the upstream+HN timeslots. Similarly, during the miscellaneous timeslot, either the synchronizer or the LAN-master nodes, can instruct all of the advanced (non-legacy) nodes, not to produce HPNA signals on the communication line, thereby allowing legacy units to transmit.

Figure 8:
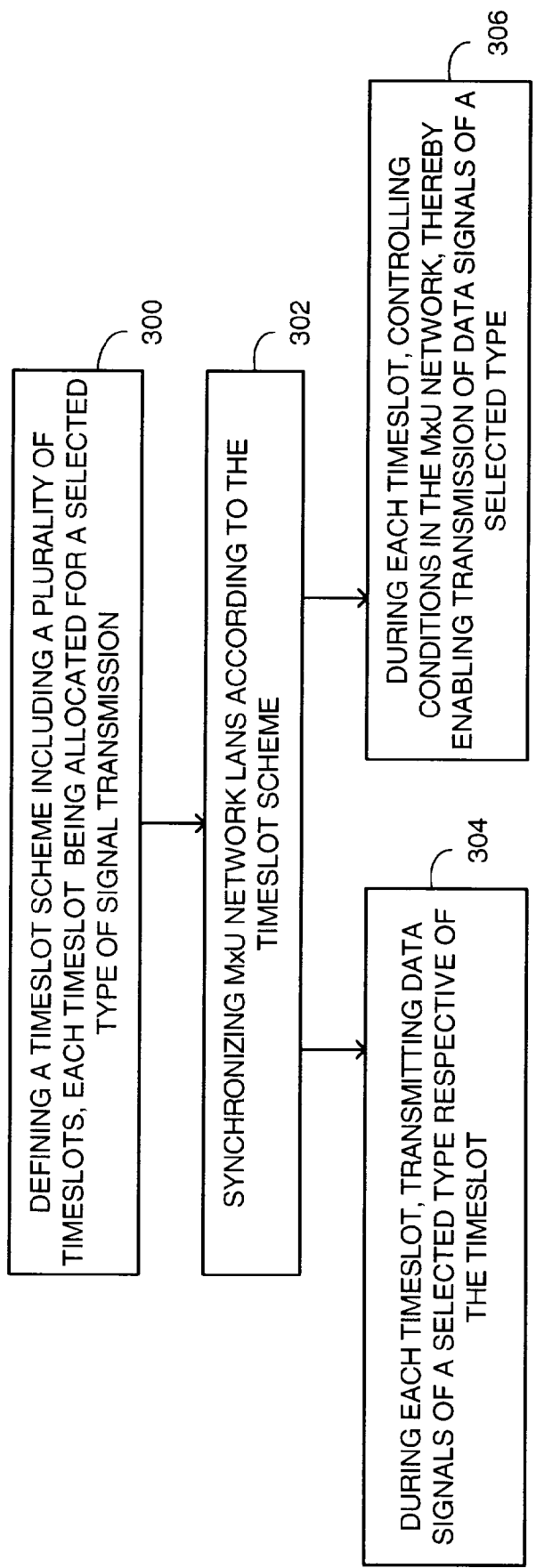
FIG. 8 is a schematic illustration of a method for reducing NEXT in an MxU network, operative in accordance with another embodiment of the disclosed technique.

Reference is now made to FIG. 8, which is a schematic illustration of a method for reducing NEXT in an MxU network, operative in accordance with another embodiment of the disclosed technique. In procedure 300, a timeslot scheme is defined. The timeslot scheme includes a plurality of timeslots, each being allocated for a selected type of signal transmission (i.e., upstream, downstream, HN, miscellaneous, or a certain combination thereof). In the example set forth in FIGS. 3, 6A and 6B, a timeslot scheme such as $204_1$ or $214_1$ is either embedded in synchronizer 116 or defined in real-time thereby. It is noted that alternatively, other sources may define the timeslot scheme, such as a node of MxU network 100, an external node of the WAN, a user of MxU network 100, and the like. In the example set forth in FIG. 6A, timeslot $204_1$ is allocated for downstream transmission, and timeslot $204_2$ is allocated for upstream and HN transmission.

In procedure 302, MxU LAN-masters are synchronized according to the timeslot scheme. The synchronization causes all of the nodes in each of the LANs to operate as defined in the timeslot scheme. With reference to FIG. 3, synchronizer 116 instructs each one of the LAN-master nodes of MxU network 100 to regulate their respective LANs according to the selected timeslot scheme. Accordingly, gateways $122_1$, $122_2$ and $122_N$ are allowed to transmit upstream signals only during timeslot $204_1$. Similarly, the nodes of intra-apartment networks $112_1$, $112_2$ and $122_N$ are allowed to transmit upstream+HN signals only during timeslot $204_2$.

In procedure 304, signals of a selected type are transmitted, during each of the respective timeslots. With reference to FIG. 3, gateways $122_1$, $122_2$ and $122_N$ transmit upstream signals only during timeslot $204_1$ and the nodes of intra-apartment networks $112_1$, $112_2$ and $122_N$ transmit upstream+HN signals only during timeslot $204_2$. It is noted that procedure 304 is applied repetitively.

In procedure 306, conditions on the network are controlled, thereby enabling transmission of data signals of special types, such as legacy communication signals. In the example set forth in FIGS. 3 and 5B, synchronizer 126 produces no HPNA signals on the MxU network, during the downstream and upstream+HN timeslots, and an appropriate HPNA signal during miscellaneous timeslot $214_3$. The HPNA signal indicates to legacy units that they are not allowed to transmit, as long as they detect it.

It is noted that procedure 306 is optional, and may be omitted in certain networks. For example, in a network comprising solely of nodes operating according to a single communication specification (i.e., non-legacy nodes), there may be no need to control the conditions on the network. It is noted that when applying procedure 306, it has to be integrated with procedure 304, so that both procedures are provided simultaneously. Timeslot scheme 212 (FIG. 6B) is an example for integrating both procedures 304 and 306.

Figure 9:
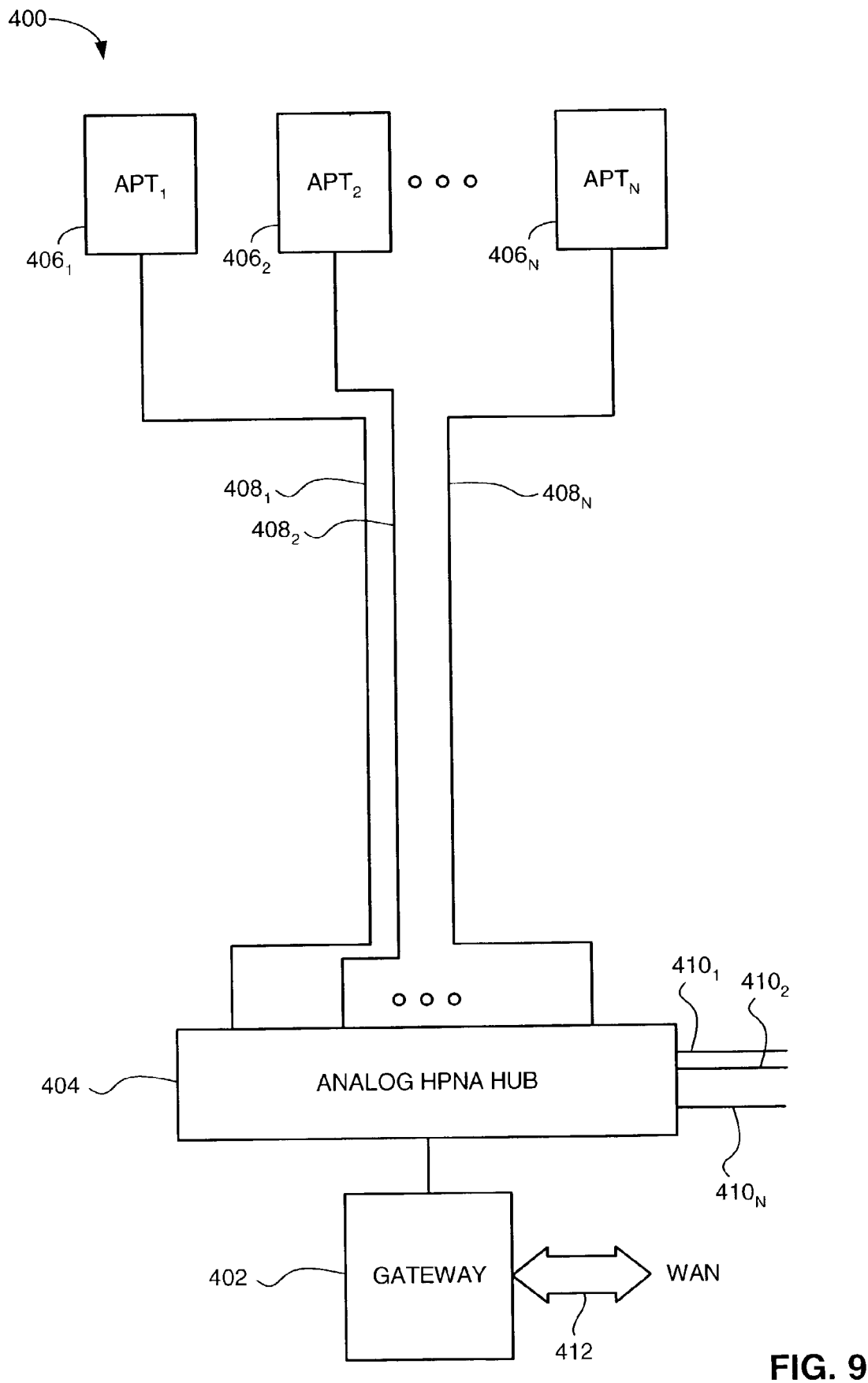
FIG. 9 is a schematic illustration of an MxU network, constructed and operative in accordance with a further embodiment of the disclosed technique.

Reference is now made to FIG. 9, which is a schematic illustration of an MxU network, generally referenced 400, constructed and operative in accordance with a further embodiment of the disclosed technique. It is noted that FIG. 9 is not drawn to scale. In the present example, MxU network 400 is an apartment building network. It is noted, however, that the disclosed technique is applicable for any type of MxU network.

Apartment building network 400 includes intra-apartment networks $APT_1$ (referenced $406_1$), $APT_2$ (referenced $406_2$) and $APT_N$ (referenced $406_N$), a gateway 402, and an analog HPNA hub 404. Each of intra-apartment networks $406_1$, $406_2$ and $406_N$ includes a plurality of network nodes (not shown). A broadband source 412 couples gateway 402 with a wide area network (WAN) such as the Internet, via a broadband link such as xDSL, cable, fiber-optic, satellite, Local Multipoint Distribution System (LMDS), and the like. Analog HPNA hub 404 is coupled with intra-apartment networks $406_1$, $406_2$ and $406_N$, through phone wires $408_1$, $408_2$ and $408_N$, respectively. Analog HPNA hub 404 is further coupled with gateway 402. Analog HPNA hub 404 enables data signal transmissions between intra-apartment networks $406_1$, $406_2$ and $406_N$, to pass there through. Thus, gateway 402 and intra-apartment networks $406_1$, $406_2$ and $406_N$ together form a local-area network (LAN).

Analog HPNA hub 404 is further coupled with external telephone lines $410_1$, $410_2$ and $410_N$. External telephone lines $410_1$, $410_2$ and $410_N$ provide the intra-apartment networks $406_1$, $406_2$ and $406_N$, respectively, with conventional telephony service. External telephone lines $410_1$, $410_2$ and $410_N$ couple network 400 with a telephony exchange system such as a telephone company central office (CO) switch, a public branch exchange (PBX) system, and the like.

It is noted that each of external telephone lines $410_1$, $410_2$ and $410_N$ may, alternatively, be coupled directly with the respective phone wire $408_1$, $408_2$ and $408_N$. Analog HPNA hub 404 prevents conventional telephony transmissions between intra-apartment networks $406_1$, $406_2$ and $406_N$, from passing there through.

It is noted that a security mechanism may be incorporated in MxU network 400. For example, in accordance with the techniques disclosed in the above mentioned U.S. patent application Ser. No. 10/127,693, the HPNA nodes of the network may use encryption and decryption keys. Accordingly, the network nodes encrypt and decrypt the transmitted and received data packets, respectively. These techniques may be applied in various communication protocol layers.

Figure 10:
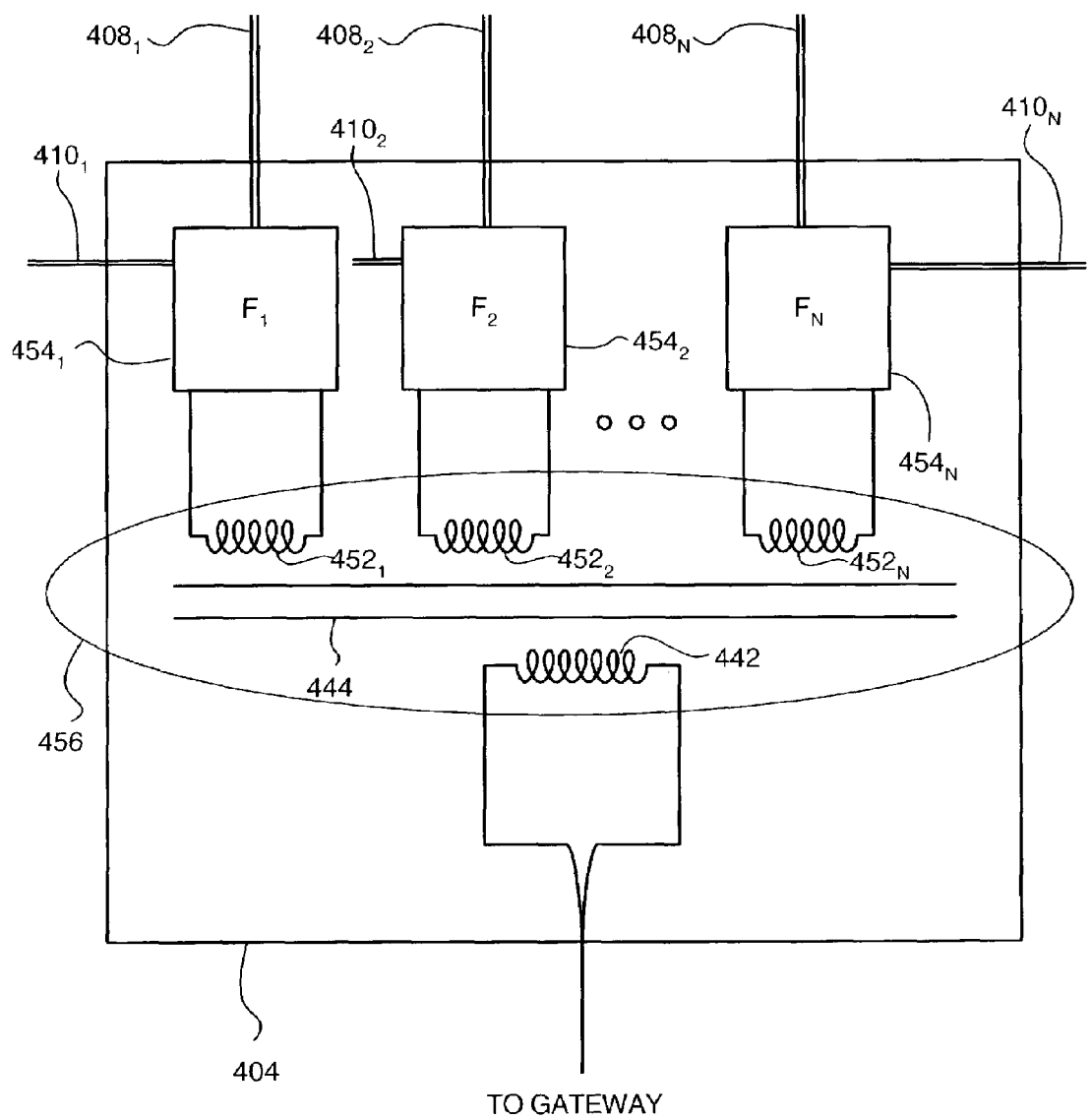
FIG. 10 is an illustration in detail of the analog HPNA hub and a plurality of phone wires of FIG. 9.

Reference is now made to FIG. 10, which is an illustration in detail of the analog HPNA hub 404 of FIG. 9, and phone wires $408_1$, $408_2$ and $408_N$. Analog HPNA hub 404 includes coils 442, $452_1$, $452_2$ and $452_N$, a core 444, and filters $F_1$ (referenced $454_1$), $F_2$ (referenced $454_2$) and $F_N$ (referenced $454_N$).

Coil 442 is coupled with gateway 402 (FIG. 9). Each filter $454_i$ is coupled with a respective coil $452_i$, telephone line $410_i$ and with phone wire $408_1$. Coil 442 and coils $452_1$, $452_2$ and $452_N$ are wound around core 444. It is noted that FIG. 10 provides a schematic representation of core 444, coil 442 and coils $452_1$, $452_2$ and $452_N$.

A signal passing through one of the coils 442, $452_1$, $452_2$ and $452_N$ is induced in the rest of the coils 442, $452_1$, $452_2$ and $452_N$. Core 444 enhances this electrical induction between coils 442, $452_1$, $452_2$ and $452_N$. Thus, the combination of core 444 and coils 442, $452_1$, $452_2$ and $452_N$, generally referenced 456, effectively operates as a transformer between gateway 402 (FIG. 9) and phone wires $408_1$, $408_2$ and $408_N$. It is noted that transformer 456 provides DC isolation between gateway 402 (FIG. 9) and phone wires $408_1$, $408_2$ and $408_N$.

It is noted that various types of transformers may be incorporated in hub 404, instead of transformer 456. It is further noted that the transformer used in hub 404, may be core-less. For example, coils 442, $452_1$, $452_2$ and $452_N$ may be intertwined there between, whereby electrical induction occurs without the use of a core. It is still further noted that the hub may include a plurality of cores, as shall be shown herein below with reference to FIG. 12.

Each filter $454_i$ prevents conventional telephony transmissions signals between twisted pair $408_i$, telephone line $410_i$, and coil $452_i$ from passing there through, while allowing data transmissions between twisted pair $408_i$, telephone line $410_i$ and coil $452_i$ to pass there through. Thus, conventional telephony transmissions do not interfere there between in MxU network 400.

Figure 11:
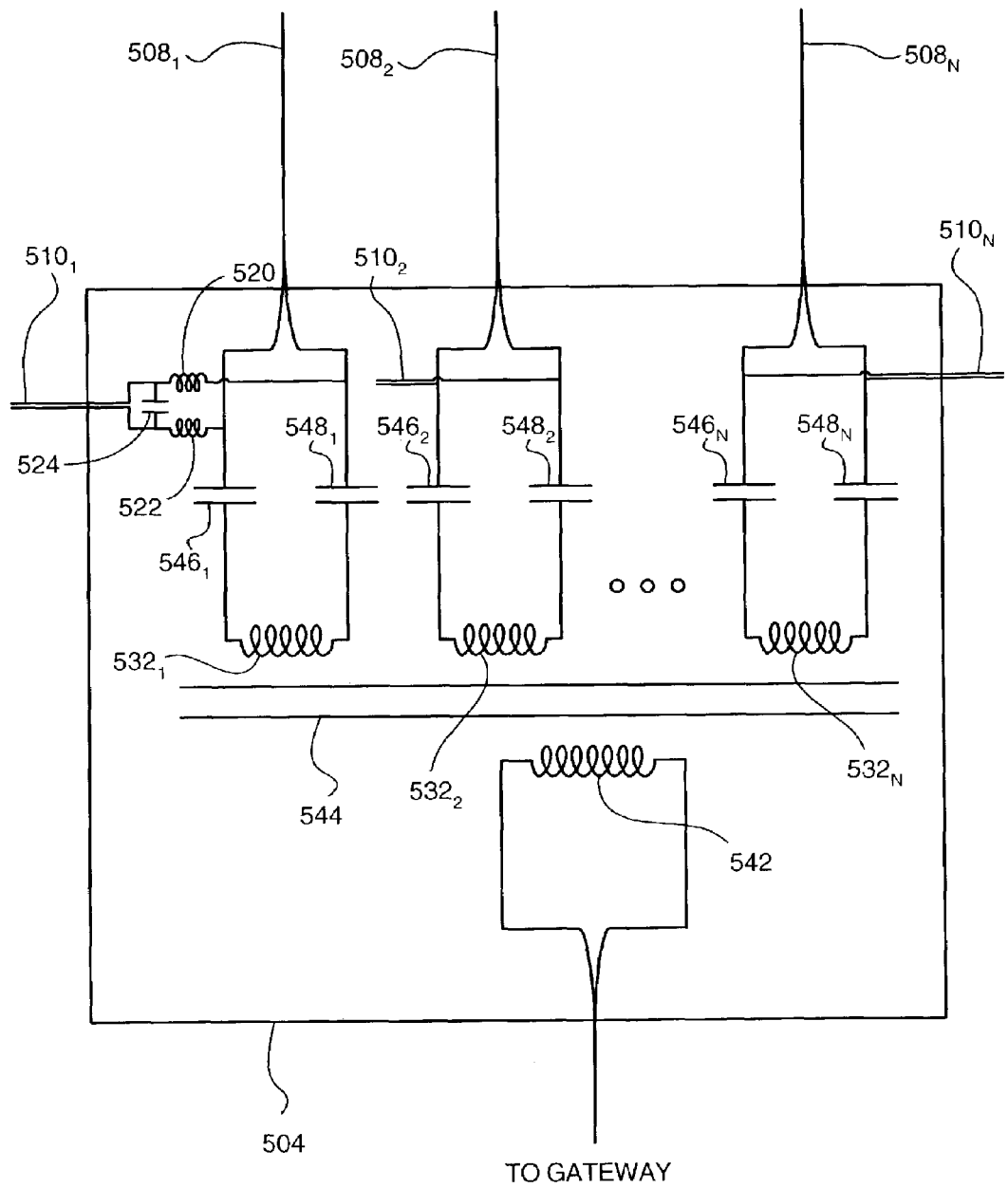
FIG. 11 is a schematic illustration of an analog HPNA hub, constructed and operative in accordance with another embodiment of the disclosed technique, and a plurality of phone wires.

Reference is now made to FIG. 11, which is a schematic illustration of an analog HPNA hub 504, constructed and operative in accordance with another embodiment of the disclosed technique, and a plurality of phone wires $508_1$, $508_2$ and $508_N$. Analog HPNA hub 504 may be incorporated in an MxU network (not shown), generally similar to MxU network 400 (FIG. 9). The MxU network includes phone wires $508_1$, $508_2$ and $508_N$, generally similar to phone wires $408_1$, $408_2$ and $408_N$ (FIG. 9), reaching a plurality of apartment networks (not shown).

Analog HPNA hub 504 includes coils 520, 522, 542, $532_1$, $532_2$ and $532_N$, a core 544, and capacitors 524, $546_1$, $546_2$, $546_N$, $548_1$, $548_2$ and $548_N$. Coil 542 is coupled with a gateway (not shown) of the MxU network. Capacitor 524 is coupled with an external telephone line $510_1$, and connected in series between coils 520 and 522. Coils 520 and 522 are further coupled with twisted pair $508_1$ and with capacitors $546_1$ and $548_1$. Each coil $532_i$ is connected in series between the respective pair of capacitors $546_i$ and $548_i$. The pair of capacitors $546_1$ and $548_1$ is further coupled with a phone wire $508_1$ and with coil $532_1$. Each pair of capacitors $546_i$ and $548_i$, wherein i is an integer between 2 and N, is further coupled with respective phone wire $508_i$ and a respective external telephone line $510_i$.

Each pair of capacitors $546_i$ and $548_i$ operates as a high-pass filter, similar to filters $454_i$ (FIG. 10). For example, the capacitance of each of capacitors $546_i$ and $548_i$ may be 5 nF. Accordingly, these capacitors shall provide a rejection of 55 dB to conventional telephony signals (i.e., these signals shall undergo a 562-fold amplitude attenuation when passing through the filters). Thus, hub 504 enables data transmissions between the intra-apartment networks of the MxU network to pass there through, while preventing conventional telephony transmissions between the intra-apartment networks from passing there through. The combination of capacitor 524 and coils 520 and 522, serves as an HPNA isolation filter. Accordingly, the combination of capacitor 524 and coils 520 and 522, substantially attenuates HPNA signals transmitted there through. This substantially reduces the risk of misinterpreting a signal transmitted from external telephone line $510_1$, as an HPNA signal. For example, NEXT interference from a nearby VDSL line may be substantially eliminated. It is noted that a similar filter may be coupled with each of filters $410_2$ and $410_N$. The values of the inductance of coils 520 and 522 and the capacitance of capacitor 524 may be, for example, 100 uH, 100 uH and 15 nF, respectively.

Figure 12:
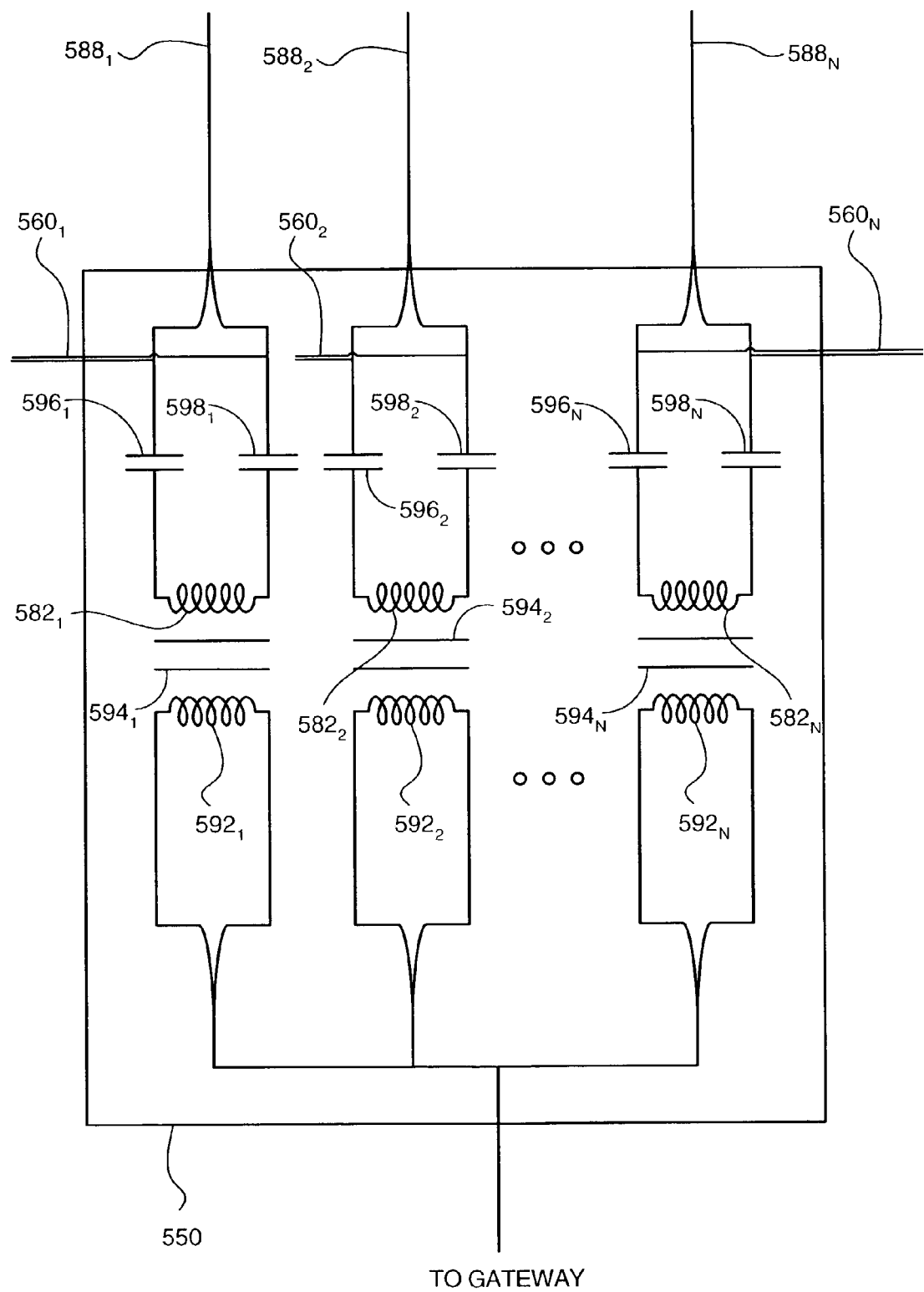
FIG. 12 is a schematic illustration of an analog HPNA hub, constructed and operative in accordance with a further embodiment of the disclosed technique, and a plurality of phone wires.

Reference is now made to FIG. 12, which is a schematic illustration of an analog HPNA hub 550, constructed and operative in accordance with a further embodiment of the disclosed technique, and a plurality of phone wires $588_1$, $588_2$ and $588_N$. Analog HPNA hub 550 may be incorporated in an MxU network (not shown), generally similar to MxU network 400 (FIG. 9). The MxU network includes phone wires $588_1$, $588_2$ and $588_N$, generally similar to phone wires $408_1$, $408_2$ and $408_N$ (FIG. 9), reaching a plurality of apartment networks (not shown).

Analog HPNA hub 550 includes coils $582_1$, $582_2$ and $582_N$, $592_1$, $592_2$ and $592_N$, cores $594_1$, $594_2$ and $594_N$, and capacitors $596_1$, $596_2$, $596_N$, $598_1$, $598_2$ and $598_N$. Coils $592_1$, $592_2$ and $592_N$ are coupled with a gateway (not shown) of the MxU network. Each coil $582_i$ is connected in series between the respective pair of capacitors $596_i$ and $598_i$. Each pair of capacitors $596_i$ and $598_i$ is further coupled with a respective external telephone line $560_i$ and respective phone wire $588_i$.

Each coil $582_i$ and each coil $592_i$, is wound around a respective core $594_i$. Thus, data signals can be communicated between the network apartments, and the gateway. However, data signals communicated directly between the apartments, without the use of the gateway, shall twice undergo the attenuation experienced by data signals communicated between the apartments and the gateway. Parameters of the network, such as the threshold for the allowed data signal amplitudes (i.e., the amplitudes beneath which the signals are regarded as noise) and the number of windings on each coil, may be predetermined so that the twice attenuated signals are beneath the allowed threshold. Thus, the apartments are effectively disabled to communicate there between directly through a core. Rather, the apartments can communicate there between, through the gateway. Since the gateway can monitor and filter some of the data signals, this enhances security in the MxU network.

It is noted that the apartments of the MxU may be divided into groups of apartments, wherein the apartments of each group are allowed to communicate directly there between, while apartments of different groups are effectively disabled to communicate directly there between. For example, coils $592_1$ and $592_2$, and one of coils $582_1$, $582_2$, may be wound about a single core (i.e., a single core replaces cores $594_1$ and $594_2$, and a single coil replaces coils $592_1$ and $592_2$), while the rest of the coils of hub 550 are wound about another single core.

Figure 13:
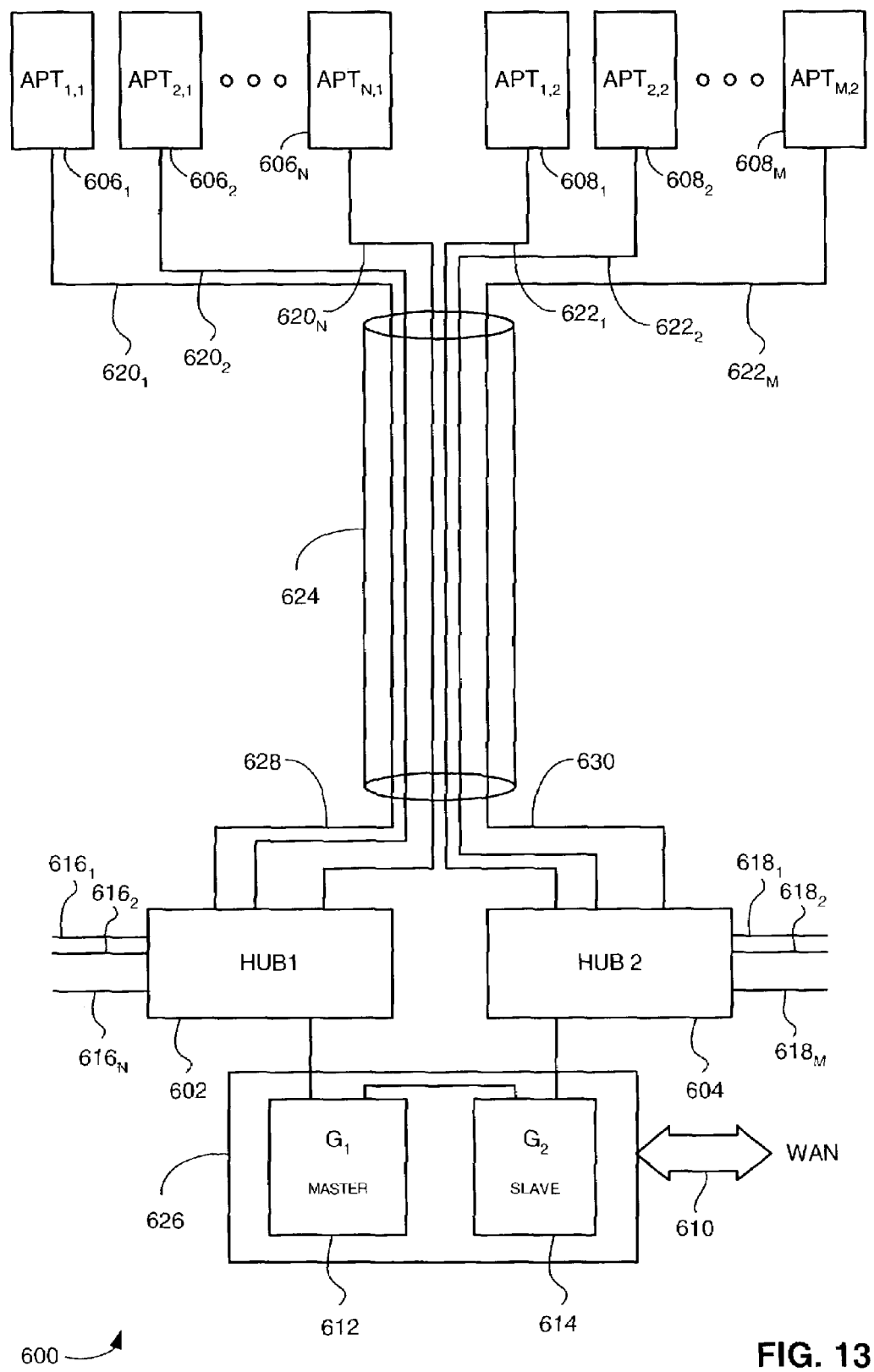
FIG. 13 is a schematic illustration of an apartment building network, constructed and operative in accordance with another embodiment of the disclosed technique.

Reference is now made to FIG. 13, which is a schematic illustration of an apartment building network, generally referenced 600, constructed and operative in accordance with another embodiment of the disclosed technique. Apartment building network 600 includes intra-apartment networks $APT_{1,1}$ (referenced $606_1$), $APT_{2,1}$ (referenced $606_2$) and $APT_{N,1}$ (referenced $606_N$), $APT_{1,2}$ (referenced $608_1$), $APT_{2,2}$ (referenced $608_2$) and $APT_{M,2}$ (referenced $608_M$). Apartment building network 600 further includes analog HPNA hubs 602 and 604, gateways $G_1$ (referenced 612) and $G_2$ (referenced 614), and phone wires $620_1$, $620_2$, $620_N$, $622_1$, $622_2$ and $622_M$. Gateways 612 and 614 are mounted on a platform 626. A broadband source 610 couples gateways 612 and 614 with a WAN.

Phone wires $620_1$, $620_2$ and $620_N$ couple hub 602 with intra-apartment networks $606_1$, $606_2$ and $606_N$, respectively. Phone wires $622_1$, $622_2$ and $622_M$ couple hub 604 with intra-apartment networks $608_1$, $608_2$ and $608_M$, respectively. A binder 624 runs from the vicinity of hubs 602 and 604, to the vicinity of intra-apartment networks $606_1$, $606_2$, $606_N$, $608_1$, $608_2$ and $608_M$. Binder 624 binds together phone wires $620_1$, $620_2$, $620_N$, $622_1$, $622_2$ and $622_M$.

Hub 602 is further coupled with gateway 612, external telephone lines $616_1$, $616_2$ and $616_N$ and with phone wire $620_1$, $620_2$, $620_N$. Hub 604 is further coupled with gateway 614, external telephone lines $618_1$, $618_2$ and $618_M$ and with phone wires $622_1$, $622_2$, $622_M$.

Hubs 602 and 604 are generally similar to hub 404 (FIG. 10). Hub 602 enables data signal transmissions between intra-apartment networks $606_1$, $606_2$ and $606_N$ to pass there through, thereby coupling those intra-apartment networks in a LAN 628. Hub 602 further prevents conventional telephony transmissions between intra-apartment networks $606_1$, $606_2$ and $606_N$ from passing there through. Similarly, analog HPNA hub 604 couples intra-apartment networks $608_1$, $608_2$ and $608_M$ in another LAN 630, and further prevents conventional telephony transmission between those apartments from passing there through.

Gateways 612 and 614 operate similarly to gateways $162_1$, $162_2$ and $162_N$ of FIG. 4 (i.e., in the example of FIG. 13, the number of gateways is equal to two). Gateway 612 operates as a master gateway to gateway 614, which operates as a slave gateway. Gateway 612 instructs the nodes of LANs 628 and 630, to operate according to a selected timeslot scheme, thereby reducing NEXT in network 600.

It is noted that an MxU network may similarly be constructed with a greater number gateways and hubs. Accordingly, one gateway operates as a master gateway, and the rest of the gateways operate as slave gateways, similarly as in the example set forth in FIG. 4.

Figure 14:
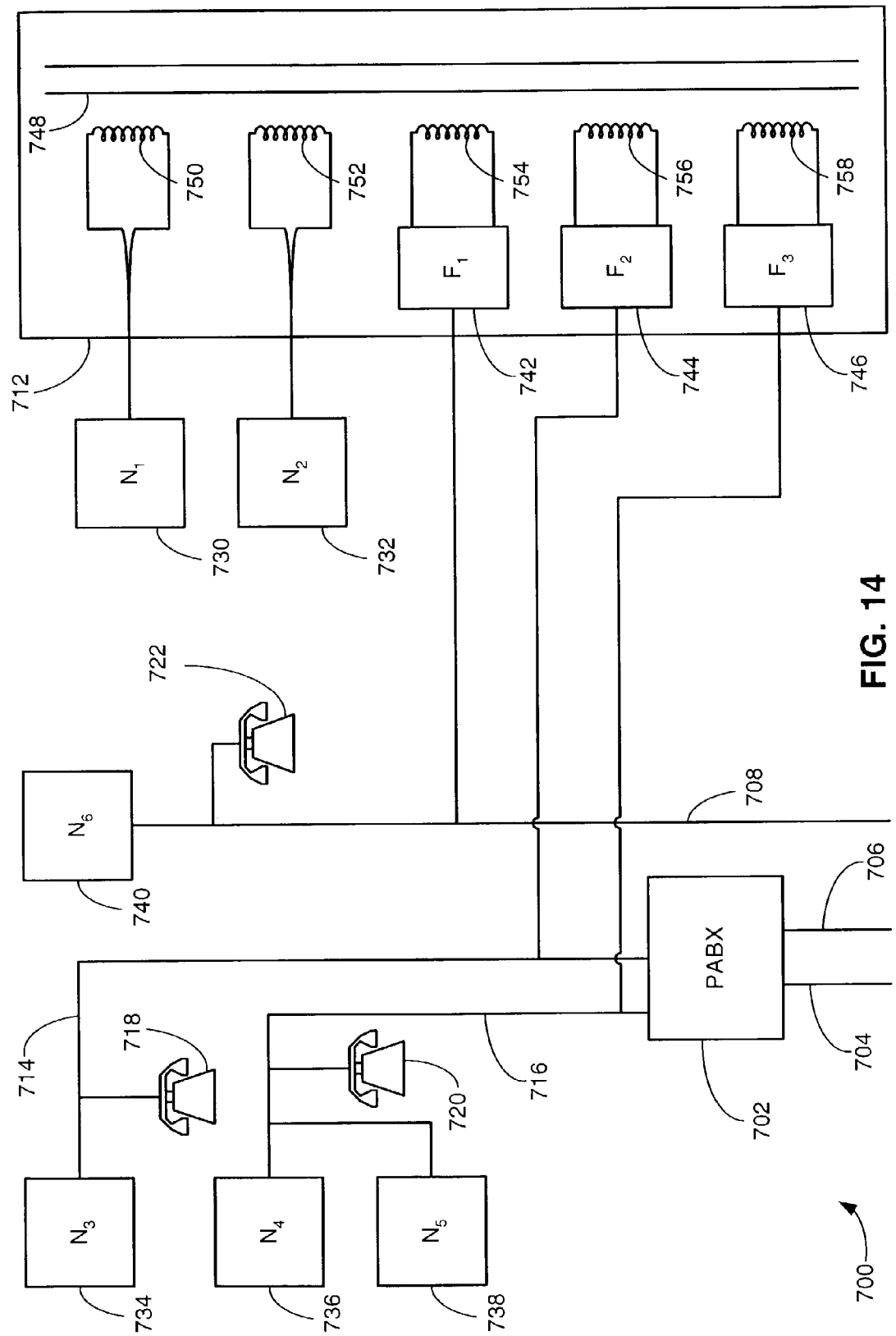
FIG. 14 is a schematic illustration of a network, constructed and operative in accordance with a further embodiment of the disclosed technique.

Reference is now made to FIG. 14, which is a schematic illustration of a network, generally referenced 700, constructed and operative in accordance with a further embodiment of the disclosed technique. Network 700 may be installed in an apartment, an office, and the like. Network 700 includes HPNA nodes $N_1$ (referenced 730), $N_2$ (referenced 732), $N_3$ (referenced 734), $N_4$ (referenced 736), $N_5$ (referenced 738), and $N_6$ (referenced 740), telephony devices 718, 720 and 722, an exchange system 702, an analog HPNA hub 712, external telephone lines 704, 706 and 708, and internal telephone lines 714 and 716.

Telephony devices 718, 720 and 722 are devices able to transmit and receive conventional telephony signals, such as telephones, facsimile machines, dial-up modems and the like. In the present example, telephony devices 718, 720 and 722 are telephones.

Exchange system (e.g., a PABX, a PBX) 702 is a device capable of managing telephony communications between telephone lines coupled therewith. In the present example, exchange system 702 is a private automatic branch exchange (PABX).

PABX 702 is coupled with external telephone lines 704 and 706. Internal telephone line 714 couples PABX 702 with telephone 718 and with HPNA node 734. Internal telephone line 716 couples PABX 702 with telephone 720 and with HPNA nodes 736 and 738. External telephone line 708 is coupled with HPNA node 740 and with telephone 722. It is noted that nodes 736 and 738 may be coupled there between in an HPNA LAN, even without using an analog HPNA hub such as hub 712 and the novel architecture of network 700. As shall be shown herein below, the novel architecture of network 700 links all of the nodes 730, 732, 734, 736, 738 and 740 together in an HPNA LAN.

Analog HPNA hub 712 is generally similar to analog HPNA hub 404 (FIG. 10). Analog HPNA hub 712 includes coils 750, 752, 754, 756 and 758, filters $F_1$ (referenced 742), $F_2$ (referenced 744) and $F_3$ (referenced 746) and a core 748. Each of filters 742, 744 and 746 is generally similar to filters $454_1$, $454_2$ and $454_N$ of FIG. 10. Each of coils 750, 752, 754, 756 and 758 is generally similar to coils $452_1$, $452_2$ and $452_N$ of FIG. 10.

Coils 750 and 752 are directly coupled with HPNA nodes 730 and 732, respectively. Coils 754, 756 and 758 are coupled with filters 742, 744 and 746. Filter 742 is further coupled with external telephone line 708. Filters 744 and 746 are further coupled with internal telephone lines 714 and 716, respectively.

PABX 702 enables conventional telephony signals between telephones 718, 720 and 722 to pass there through. It is noted that conventionally, PABX 702 exhibits internal low pass filtering and therefore, does not enable high frequency data communication signals (e.g., HPNA transmissions) between the internal telephone lines to pass there through. Hub 712 enables data signal transmissions between nodes 730, 732, 734, 736, 738 and 740 to pass there through, and prevents conventional telephony transmissions from passing there through.

It will be appreciated by persons skilled in the art that the disclosed technique is not limited to what has been particularly shown and described hereinabove. Rather the scope of the disclosed technique is defined only by the claims, which follow.

The invention claimed is:

1. An analog HPNA hub comprising:
at least three coils within said HPNA hub arranged in at least one group of coils, each said group of coils comprising a plurality of coils, said at least three coils inducing HPNA signals therebetween within said HPNA hub;
a plurality of filters, each of said filters coupled with a respective different one of said at least three coils and further coupled, via respective telephone wiring, with at least a respective HPNA node, and
at least one core within said HPNA hub, each said at least one core being associated with a respective one of said groups of coils, each said at least one core enhancing induction of HPNA signals between said coils of said respective group,
wherein each of said filters enables transmission of HPNA data signals therethrough; and
wherein each of said filters prevents transmission of conventional telephony signals therethrough,
wherein at least one of said at least three coils is directly coupled with at least another respective HPNA node, via respective wiring.

2. An analog HPNA hub comprising:
at least three coils within said HPNA hub, arranged in at least one group of coils, each of said group of coils comprising a plurality of coils, said at least three coils inducing HPNA signals therebetween within said HPNA hub;
a plurality of filters, each of said filters coupled with a different one of said at least three coils and further coupled, via respective telephone wiring, with at least a respective HPNA node, and
at least one core within said HPNA hub, each said at least one core being associated with a respective one of said groups of coils, each said at least one core enhancing induction of HPNA signals between said coils of said respective group,
wherein each of said filters enables transmission of HPNA data signals therethrough; and
wherein each of said filters prevents transmission of conventional telephony signals therethrough,
wherein at least one of said at least three coils is directly coupled with at least another respective HPNA node, via respective wiring, and wherein one of said at least another HPNA node, is a gateway node, being further coupled with a wide area network.

3. An analog HPNA hub comprising:
at least three coils within said HPNA hub arranged in at least one group of coils, each said group of coils comprising a plurality of coils, said coils inducing HPNA signals therebetween within said HPNA hub;
a plurality of filters, each of said filters coupled with a respective different one of said at least three coils and further coupled, via respective telephone wiring, with at least a respective HPNA node, and
at least one core within said HPNA hub, each said at least one core being associated with a respective one of said groups of coils, each said at least one core enhancing induction of HPNA signals between said coils of said respective group,
wherein each of said filters enables transmission of HPNA data signals therethrough; and
wherein each of said filters prevents transmission of conventional telephony signals therethrough, and
wherein at least one of said filters comprising two capacitors, a said respective different coil of said at least three coils being connected in series between said two capacitors.

4. HPNA network
at least one analog HPNA hub: and
at least one group of HPNA nodes, each said at least one group being associated with a respective one of said at least one analog HPNA hub,
wherein each said at least one analog HPNA hub includes:
a plurality of coils, for inducing HPNA signals therebetween, and
a plurality of filters, each of said filters being coupled with a respective one of said coils and further coupled, via respective telephone wiring, with at least an HPNA node in said respective group,
wherein each of said filters enables transmission of HPNA data signals therethrough,
wherein each of said filters prevents transmission of conventional telephony signals therethrough,
wherein said at least other HPNA node is a gateway node, being further coupled with a wide area network, and
wherein said network if deployed in an MxU, the network comprising at least two analog HPNA hubs
wherein for each of said at least two analog HPNA hubs, one HPNA node of said respective group is a gateway node, being further coupled with a wide area network,
wherein for each of said at least two analog HPNA hubs, a selected one HPNA node of said respective group is defined a LAN-master node,
wherein communication lines coupling each said analog HPNA hub with HPNA nodes of said respective group, are at least partially bound together,
wherein for each of said at least two analog HPNA hubs, the transmission direction within said respective group, by said respective gateway node, is defined downstream,
wherein for each of said at least two analog HPNA hubs, the transmission direction with in said respective group, to said respective gateway node, is defined upstream,
wherein for each of said at least two analog HPNA hubs, the transmission direction within said respective group, between nodes other than said respective gateway nodes is defined HN,
wherein for each of said at least two analog HPNA hubs, said LAN-master nodes allow said gateways to transmit downstream signals during at least one timeslot, and
wherein for each of said at least two analog HPNA hubs, said LAN-master nodes allow said nodes other than said gateway nodes to transmit upstream signals or HN signals, at least another timeslot.

* * * * *